US011941665B2

(12) United States Patent
Box et al.

(10) Patent No.: US 11,941,665 B2
(45) Date of Patent: Mar. 26, 2024

(54) SYSTEMS, METHODS AND ARTICLES TO FACILITATE INTEROPERABILITY BETWEEN ADVERTISING INVENTORY CHANNELS

(71) Applicant: WIDEORBIT LLC, San Francisco, CA (US)

(72) Inventors: Tyler Wallace Box, San Francisco, CA (US); David Bridges, San Francisco, CA (US); Brian M. Burdick, Newcastle, WA (US); Geoffrey P. Coco, Seattle, WA (US); Ian P. Ferreira, Issaquah, WA (US); Paul Jaffe, Sherman Oaks, CA (US); Alfred Lawrence Shiels, Glen Rock, NJ (US); Brian Thoman, Everett, WA (US); Sean Trigony, Hermosa Beach, CA (US)

(73) Assignee: WideOrbit LLC, San Francisco, CA (US)

( * ) Notice: Subject to any disclaimer, the term of this patent is extended or adjusted under 35 U.S.C. 154(b) by 161 days.

(21) Appl. No.: 15/279,073

(22) Filed: Sep. 28, 2016

(65) Prior Publication Data
US 2017/0098252 A1 Apr. 6, 2017

Related U.S. Application Data

(60) Provisional application No. 62/250,170, filed on Nov. 3, 2015, provisional application No. 62/250,165, filed
(Continued)

(51) Int. Cl.
*G06Q 30/0273* (2023.01)
*G06Q 30/0241* (2023.01)
(Continued)

(52) U.S. Cl.
CPC ..... *G06Q 30/0275* (2013.01); *G06Q 30/0246* (2013.01); *G06Q 30/0249* (2013.01);
(Continued)

(58) Field of Classification Search
None
See application file for complete search history.

(56) References Cited

U.S. PATENT DOCUMENTS 7,085,732 B2 8/2006 Gould
7,356,547 B2 * 4/2008 Ozer ................ G06Q 30/02
(Continued)

FOREIGN PATENT DOCUMENTS

AU 2016201005 A1 * 3/2016
CA 2873970 A1 * 8/2014 ......... G06Q 30/0275
(Continued)

OTHER PUBLICATIONS

Author(s): Kaliski, Rafael Title: Dynamic resource allocation and advertisement revenue optimization for TV over eMBMS. Journal: IEEE [online]. Publication date: Sep. 2016 [retrieved on: Mar. 7, 2022 ]. Retrieved from the Internet: < URL:https://ieeexplore.ieee. org/abstract/document/7482770 (Year: 2016).*
(Continued)

*Primary Examiner* — Michael W Schmucker
*Assistant Examiner* — Alfred H Tsui
(74) *Attorney, Agent, or Firm* — Seed IP Law Group LLP

(57) ABSTRACT

Systems and methods for providing an advertisement marketplace where buyers and sellers can trade linear mediacast advertisement inventory programmatically at local, national, and/or worldwide levels. The marketplace system may include a seller-controlled marketplace system which connects sellers with buyers and offers revenue management tools for optimizing yields across direct and programmatic channels. The advertisement inventory is bought and sold as
(Continued)

US 11,941,665 B2
Page 2 canonical inventory units which group similar but discrete advertisement slots together. The marketplace system may include a real-time bidding (RTB) adapter through which digital advertising buyers may place bids for such inventory units using standard protocols utilized in digital RTB systems.

25 Claims, 25 Drawing Sheets

Related U.S. Application Data on Nov. 3, 2015, provisional application No. 62/236,350, filed on Oct. 2, 2015.

(51) Int. Cl.
  G06Q 30/0242 (2023.01)
  G06Q 30/08 (2012.01)
  H04N 21/234 (2011.01)
  H04N 21/2543 (2011.01)
  H04N 21/262 (2011.01)
  H04N 21/2665 (2011.01)
  H04N 21/81 (2011.01)

(52) U.S. Cl.
  CPC ....... G06Q 30/08 (2013.01); H04N 21/23424 (2013.01); H04N 21/25435 (2013.01); H04N 21/26225 (2013.01); H04N 21/26241 (2013.01); H04N 21/26283 (2013.01); H04N 21/2665 (2013.01); H04N 21/812 (2013.01)

(56) References Cited

U.S. PATENT DOCUMENTS

| | | | |
|---|---|---|---|
| 7,949,562 B2 | 5/2011 | Collins | |
| 7,974,880 B2 | 7/2011 | Schwarz | |
| 8,073,738 B2 | 12/2011 | Protheroe et al. | |
| 8,099,328 B2 | 1/2012 | Protheroe et al. | |
| 8,321,274 B2 | 11/2012 | Collins et al. | |
| 8,335,718 B2 | 12/2012 | Feldman et al. | |
| 8,615,436 B2* | 12/2013 | Stukenborg | G06Q 30/0275 725/35 |
| 8,682,721 B1 | 3/2014 | Kent | |
| 8,788,336 B1 | 7/2014 | Baratloo et al. | |
| 8,799,078 B1 | 8/2014 | Kniaz | |
| 8,996,712 B2 | 3/2015 | Green et al. | |
| 9,699,502 B1* | 7/2017 | Sandholm | H04N 21/6582 |
| 9,980,010 B2 | 5/2018 | Ray et al. | |
| 10,497,010 B1 | 12/2019 | Zhang et al. | |
| 11,250,477 B1 | 2/2022 | Anand et al. | |
| 2002/0023039 A1* | 2/2002 | Fritsch | G06Q 30/0601 705/26.1 |
| 2003/0074303 A1 | 4/2003 | Gould | |
| 2006/0004628 A1 | 1/2006 | Axe et al. | |
| 2006/0015409 A1 | 1/2006 | Kato et al. | |
| 2007/0288350 A1 | 12/2007 | Bykowsky | |
| 2008/0071594 A1 | 3/2008 | Morin | |
| 2008/0082400 A1 | 4/2008 | Martel et al. | |
| 2008/0120638 A1 | 5/2008 | King et al. | |
| 2008/0215418 A1 | 9/2008 | Kolve et al. | |
| 2008/0221982 A1 | 9/2008 | Harkins et al. | |
| 2008/0243601 A1 | 10/2008 | Patel et al. | |
| 2008/0275753 A1 | 11/2008 | Protheroe et al. | |
| 2008/0275777 A1* | 11/2008 | Protheroe | G06Q 30/0264 705/14.71 |
| 2009/0030829 A1 | 1/2009 | Chatter et al. | |
| 2009/0099902 A1 | 4/2009 | Chatter et al. | |
| 2009/0106100 A1 | 4/2009 | Mashinsky | |
| 2009/0112609 A1 | 4/2009 | Dangaltchev | |
| 2009/0313120 A1 | 12/2009 | Ketchum | |
| 2010/0223141 A1* | 9/2010 | Spencer | G06Q 30/0275 705/26.1 |
| 2011/0040634 A1* | 2/2011 | Landsberry | H04N 21/26225 705/14.69 |
| 2011/0082756 A1 | 4/2011 | Eisnor et al. | |
| 2011/0161162 A1 | 6/2011 | Ketchum | |
| 2011/0225026 A1 | 9/2011 | Ketchum | |
| 2012/0209742 A1 | 8/2012 | Steigelfest | |
| 2013/0144723 A1 | 6/2013 | Green et al. | |
| 2013/0165642 A1 | 6/2013 | Mason et al. | |
| 2013/0198328 A1 | 8/2013 | Green et al. | |
| 2013/0246567 A1 | 9/2013 | Green et al. | |
| 2013/0247095 A1 | 9/2013 | Weihs et al. | |
| 2013/0282495 A1 | 10/2013 | Gilbane et al. | |
| 2014/0068648 A1 | 3/2014 | Green et al. | |
| 2014/0074591 A1 | 3/2014 | Allen et al. | |
| 2014/0081742 A1 | 3/2014 | Katsur | |
| 2014/0100944 A1 | 4/2014 | Zhu et al. | |
| 2014/0136337 A1 | 5/2014 | Ringdahl | |
| 2014/0222590 A1 | 8/2014 | Chatter et al. | |
| 2014/0324603 A1* | 10/2014 | Savkar | H04N 21/254 705/14.71 |
| 2014/0365317 A1 | 12/2014 | Goel | |
| 2015/0025962 A1 | 1/2015 | Becket et al. | |
| 2015/0058138 A1* | 2/2015 | Schler | G06Q 30/0275 705/14.71 |
| 2015/0074732 A1 | 3/2015 | Green et al. | |
| 2015/0095166 A1 | 4/2015 | Sweeney | |
| 2015/0120459 A1* | 4/2015 | Zeigler | H04N 21/812 705/14.61 |
| 2015/0154650 A1 | 6/2015 | Umeda | |
| 2015/0206231 A1 | 7/2015 | Smith et al. | |
| 2015/0269632 A1 | 9/2015 | Ledwich et al. | |
| 2015/0334434 A1 | 11/2015 | Green et al. | |
| 2015/0363820 A1* | 12/2015 | Leitersdorf | G06Q 30/02 705/14.41 |
| 2015/0363835 A1 | 12/2015 | Khan et al. | |
| 2016/0117719 A1 | 4/2016 | Hood et al. | |
| 2017/0098251 A1 | 4/2017 | Box et al. | |
| 2017/0098252 A1 | 4/2017 | Box et al. | |
| 2017/0098253 A1 | 4/2017 | Box et al. | |
| 2018/0308025 A1 | 10/2018 | Bansal et al. | |
| 2020/0118160 A1 | 4/2020 | Ferreira et al. | |
| 2020/0211056 A1 | 7/2020 | Thoman et al. | |

FOREIGN PATENT DOCUMENTS

| | | |
|---|---|---|
| JP | 2006222620 A | 8/2006 |
| JP | 2007-226816 A | 9/2007 |
| JP | 2008160541 A | 7/2008 |
| JP | 2014-146274 A | 8/2014 |
| KR | 10-2010-0108191 A | 10/2010 |
| KR | 10-2012-0034434 A | 4/2012 |
| WO | 2008/119049 A2 | 10/2008 |
| WO | 2015/024003 A2 | 2/2015 |

OTHER PUBLICATIONS

Author(s): Kitts, Brendan Title:Attribution of conversion events to multi channel media. Journal: IEEE [online]. Publication date: 2010 [retrieved on: Dec. 2, 2022 ]. Retrieved from the Internet: < URL:https://ieeexplore.ieee.org/stamp/stamp.jsp?tp=&arnumber=5694055 (Year: 2010).*

Author(s): Changyan, Yi Title:Auction based spectrum sharing in multi channel cognitive . Journal: University of Manitoba [online]. Publication date: 2014 [retrieved on: Aug. 1, 2023]. Retrieved from the Internet: < URL:https://mspace.lib.umanitoba.ca/items/a09aecbe-ae52-46f8-86e0-c61bea97f10d> (Year: 2014).*

Author(s): Perlich, Claudia Title: Bid Optimizing and invetory scoring in targeted online Journal: ACM [online]. Publication date: 2012 [retrieved on: Nov. 16, 2023]. Retrieved from the Internet: < URL:https://dl.acm.org/doi/pdf/10.1145/2339530.2339655> (Year: 2012).*

Box et al., "Systems, Methods and Articles to Facilitate Cross-Channel Programmatic Purchasing of Advertising Inventory," U.S. Appl. No. 15/448,228, filed Mar. 2, 2017, 78 pages.

International Search Report and Written Opinion, dated Jun. 7, 2017, for corresponding International Application No. PCT/US2017/020436, 13 pages.

(56) References Cited

OTHER PUBLICATIONS

International Search Report and Written Opinion dated Jan. 11, 2017, for corresponding International Application No. PCT/US2016/054183, 15 pages.
International Search Report and Written Opinion dated Jan. 13, 2017, for corresponding International Application No. PCT/US2016/054176, 11 pages.
International Search Report and Written Opinion dated Dec. 8, 2016, for corresponding International Application No. PCT/US2016/054169, 15 pages.
David S. Evans, "The Economics of the Online Advertising Industry," *Review of the Network Economics.* 7(3):1-33, 2008.
Green et al., "Systems, Methods and Articles to Automatically Expose and Place Material in Streams of Programming,6" U.S. Appl. No. 61/561,186, filed Nov. 17, 2011, 50 pages.
Green et al., "Content Management and Provisioning System," U.S. Appl. No. 62/172,693, filed Jun. 8, 2015, 29 pages.
Kudyba, "Big Data, Mining, and Analytics: Components of Strategic Decision Making," *CRC Press—Taylor & Francis Group*, 306 pages, 2014.
Zhang et al., "Optimized Bidding Algorithm of Real Time Bidding in Online Ads Auction," *2014 International Conference on Management Science & Engineering 21th Annual Conference Proceedings*, pp. 33-42, 2014. doi: 10.1109/ICMSE.2014.6930205.
Extended European Search Report, dated Dec. 14, 2018, for European Application No. 16852483.3-1208, 9 pages.
Extended European Search Report, dated Dec. 14, 2018, for European Application No. 16852486.6-1208, 11 pages.
Extended European Search Report, dated Dec. 14, 2018, for European Application No. 16852490.8-1208, 9 pages.
Ferreira et al., "Systems, Methods and Articles for Buy-Side Optimization of Content Placement in Linear Mediacasts," U.S. Appl. No. 16/156,869, filed Oct. 10, 2018, 63 pages.
IAB, "OpenRTB API Specification," Version 2.1, Oct. 2012, 80 pages.
Thoman et al., "Systems, Methods and Articles for Sell-Side Optimization of Content Placement in Linear Mediacasts," U.S. Appl. No. 16/232,734, filed Dec. 26, 2018, 46 pages.
Offeman et al., "Systems, Methods and Articles for Audience Delivery Optimization," U.S. Appl. No. 16/143,214, filed Sep. 26, 2018, 34 pages.
Office Action, dated Aug. 28, 2018, for U.S. Appl. No. 15/279,069, Box et al., "Systems, Methods and Articles to Facilitate Selling of Advertising Inventory ," 28 pages.
Office Action, dated Aug. 28, 2018, for U.S. Appl. No. 15/279,077, Box et al., "Systems, Methods and Articles to Facilitate Buying and Selling of Advertising Inventory ," 27 pages.

\* cited by examiner

602 — IMPLEMENT BUDGET CAPPING THAT PREVENTS ACCEPTANCE OF REQUESTS FROM ADVERTISER ONCE ADVERTISER-SPECIFIED BUDGET FOR DEFINED CAMPAIGN IS EXCEEDED BY ACCEPTANCE BY MEDIACAST CONTENT PROVIDERS OF OTHER REQUESTS BY ADVERTISER FOR DEFINED CAMPAIGN

FIG.6

702 — IMPLEMENT SMOOTHING THAT PREVENTS ACCEPTANCE OF REQUESTS FROM ADVERTISER ONCE ADVERTISER SPECIFIED MAXIMUM CONCENTRATION FOR DEFINED CAMPAIGN IS EXCEEDED BY ACCEPTANCE BY MEDIACAST CONTENT PROVIDERS OF OTHER REQUESTS BY ADVERTISER FOR DEFINED CAMPAIGN

FIG.7

802 — IMPLEMENT DAILY CLOSE OF ALL ADVERTISEMENT PLACEMENT OPPORTUNITIES PERTAINING TO GIVEN MEDIACAST DAY, REQUESTS FOR ADVERTISEMENT PLACEMENT OPPORTUNITIES PERTAINING TO GIVEN MEDIACAST DAY, AND ACCEPTANCES OF REQUESTS FOR ADVERTISEMENT PLACEMENT OPPORTUNITIES PERTAINING TO GIVEN MEDIACAST DAY

FIG.8

New Direct Response Avail ⊗

- 1302 Description
- 1304 Pricing
- 1306 Reserve Rule

Name:
Weekend Morning — 1308

Program Notes:
After News DR — 1310

Channel:
KCPO — 1312

Start Time:
8:00 AM — 1314

End Time:
10:00 PM — 1316

Days:
| M | TU | W | TH | F | SA | SU | — 1318

Spot Lengths: (seconds) — 1320
- ☐ 00:05
- ☐ 00:10
- ☐ 00:15
- ☑ 00:30
- ☐ 00:45
- ☐ 01:00
- ☑ 01:30
- ☐ 02:00

SAVE  CANCEL

New Accept Rule

- 1402 — Description
- 1404 — Rule Items

Start Time: 2:00 XM — 1406
End Time: 4:30 XM — 1408

Days: M | TU | W | TH | F   SA | SU — 1410

EU30s to Sell: 5 — 1412

☐ Only Allow Approved Creative. — 1414

Unit Lengths: — 1416
- ☐ 00:05
- ☐ 00:10
- ☐ 00:15
- ☑ 00:30
- ☐ 00:45
- ☐ 01:00
- ☐ 01:30
- ☐ 02:00

[END] [PAUSE]   [SAVE] [CANCEL]

Creatives — 1504

| Action | Advertiser | Title | Ad Id | Status | Agency | Primary Category | File |
|---|---|---|---|---|---|---|---|
| | Good Feet | Good Feed–Mizuno Co–... | MIZU0001000H | Needs Review | Initiative | | No Time to Think–YouTu |
| | The SCOOTER Store | KTEST1 | WOID497568358 | Approved | Initiative | | womc-passion.mp4 |
| | GroupM's Test Advertiser | Monday Night Hockey | BB0008 | Rejected | Groupm Test Agency | | sintel-1024-stereo.mp4 |
| | Chief Media | Sixty Hours | WOID3535753452 | Needs Review | Chief Media | Technology & Computing–C/C++ | Tenali Raman–Official Th |
| | Chief Media | Somke(june5) | WOID1648273945 | Needs Review | Chief Media | Technology & Computing–C/C++ | Tenali Raman–Official Th |
| | Chief Media | Walking Dead | WOID2283926915 | Needs Review | Initiative | Technology & Computing–C/C++ | oreo.mp4 |
| | Tempur-Pedic | Ritz/Oreo Pre-BB | WOID4241929929 | | | | womc-passion(1).mp4 |

DEMAND APPROVALS RESULTS SETUP
Creative | Credit | Avail Rates

FIG.16

| Channel ↑ | Claimed | Unclaimed | Claimed Uplift | Top Advertisers | Highest Offer | # of Offers |
|---|---|---|---|---|---|---|
| KCPQ | $311,512 | $1,834,870 | +308,864 | Work Sharp, Thompson Creek Window Company, David's Dollar Store | $53,797 | 4970 |
| KDAF | $7,701 | $1,587,928 | | Thompson Creek Window Company, David's Dollar Store, GroupM's Test Adventure | $11,794 | 3651 |
| KIAH2 | $7,202 | $1,606,902 | | Thompson Creek Window Company, Gunthy-Renker, David's Dollar Store | $11,106 | 3457 |
| KRCW | $9,822 | $327,447 | | Thompson Creek Window Company, GroupM's Test Advertiser, Green Inc. | $3,836 | 2751 |
| KSWB | $2,895 | $952,482 | | Thompson Creek Window Company, David's Dollar Store, GroupM's Test Advertiser | $18,125 | 2901 |
| KTLA | $11,736 | $4,605,468 | | Thompson Creek Window Company, David's Dollar Store, GroupM's Test Advertiser | $45,583 | 5183 |
| KTXL | $256 | $1,153,563 | | Thompson Creek Window Company, David's Dollar Store, Chief Media | $19,031 | 3710 |
| KZJO | $10,648 | $499,468 | | Thompson Creek Window Company, GroupM's Test Advertiser, SENSA Products | $5,732 | 3615 |

Demand Calendar

Channel: KPTV-3 ▼  Week: 06/22/2015 📅  — 1702, 1710, 1704

Demand Lens View: Uplift Amount ▼ — 1708

Campaigns

SENSA Products
June Weight Loss Special
Ad Id: WOID466076770
Agency: Initiative
[Credit Needs Review] [Creative Needs Review]

SENSA Products
Sensodyne Pronamel
Ad Id: WOID381091271
Agency: Initiative
[Credit Needs Review] [Creative Needs Review]

Geico
Monday Night Hockey
Ad Id: BB0008
Agency: AdMax Media Inc.
[Credit Needs Review] [Creative Approved]

[ACCEPT ROTATION] — 1714

(Rates are EU30s) — 1706

| Time | Mon 6/22 | Tue 6/23 | Wed 6/24 | Thu 6/25 | Fri 6/26 | Sat 6/27 | Sun 6/28 |
|---|---|---|---|---|---|---|---|
| 5:00 PM | 9  $1,453 +228 | 8  $1,467 +547 | 6  $1,988 +999 | 7  $2,130 +1,129 | 9  $1,484 +96 | 5  $1,260 +615 | 9  $1,822 +1,165 |
| 5:30 PM | 6  $1,813 +734 | 6  $1,924 +794 | 7  $2,361 +1,284 | 6  $2,430 +1,212 | 7  $1,889 +889 | 8  $1,360 +1,014 | 10  $1,434 +659 |
| 6:00 PM | 1  $1,803 -596 | 1  $2,036 +1,126 | 1  $2,581 +1,288 | 2  $2,722 | 1  $2,413 +1,288 | 2  $1,167 | 2  $1,115 |
| 6:30 PM | 5  $1,793 +524 | 6  $2,186 +776 | 7  $2,477 +1,288 | 8  $2,484 +1,108 | 5  $1,823 +736 | 2  $1,380 | $1,242 +499 |
| 7:00 PM | 5  $4,961 +3,627 | 4  $4,812 +3,479 | 3  $5,688 +1,288 | 5  $4,394 +3,161 | 4  $4,245 +3,234 | 8  $2,065 | 2  $1,468 |
| 7:30 PM | 6  $5,688 +4,462 | 6  $5,313 +3,075 | 4  $7,035 +1,288 | 4  $5,194 +3,537 | 5  $4,788 +3,021 | 1  $2,654 +1,927 | 1  $3,400 +2,000 |
| 8:00 PM | $4,562 +1,562 | 1  $4,113 +763 | 2  $7,480 | 1  $3,820 +419 | 1  $1,656 -1,393 | 1  $3,130 +270 | 1  $5,409 +2,909 |
| 8:30 PM | 1  $4,957 +1,757 | 1  $4,042 +842 | 2  $7,831 | 1  $4,106 +906 | 1  $1,410 -1,590 | 1  $2,785 -415 | 1  $5,931 +5,900 |
| 9:00 PM | 1  $6,995 +3,994 | 1  $2,818 +582 | 2  $8,106 | 1  $8,019 +5,018 | 2  $2,066 | 1  $2,953 -46 | 1  $4,331 +2,991 |
| 9:30 PM | 2  $7,154 +3,754 | 1  $2,079 -1,054 | 1  $8,911 +1,288 | 1  $5,275 +2,274 | 3  $2,584 | 1  $3,120 +1,920 | 3  $5,065 |
| 10:00 PM | 1  $5,375 +2,575 | 1  $3,799 +799 | 1  $6,982 +4,182 | 1  $4,747 +246 | 2  $2,742 | 1  $4,371 +2,651 | 1  $4,924 +1,923 |

FIG.17

| Channel: | Week: | | | | | | |
|---|---|---|---|---|---|---|---|
| KPTV-3 ⌄ | 06/22/2015 ⌄ | | | | | | |

Demand Lens View: Uplift Amount ⌄ | ACCEPT ROTATION |

| Campaigns | | | | | | | |
|---|---|---|---|---|---|---|---|
| SENSA Products | | | | | | | |
| June Weight Loss Special | | | | | | | |
| Ad Id: WOID466076770 | | | | | | | |
| Agency: Initiative | | | | | | | |
| SENSA Products | | | | | | | |
| Sensodyne Pronamel | | | | | | | |
| Ad Id: WOID3810912771 | | | | | | | |
| Agency: Initiative | | | | | | | |
| Geico | | | | | | | |
| Monday Night Hockey | | | | | | | |
| Ad Id: BB0008 | | | | | | | |
| Agency: AdMax Media Inc. | | | | | | | |

Credit Needs Review / Creative Needs Review
Credit Needs Review / Creative Needs Review
Credit Needs Review / Creative Approved

| Time | Mon 6/22 | | Tue 6/23 | | Wed 6/24 | | Thu 6/25 | | Fri 6/26 | | Sat 6/27 | | Sun 6/28 | |
|---|---|---|---|---|---|---|---|---|---|---|---|---|---|---|
| 5:00 PM | 9 | $1,453 +228 | 8 | $1,467 +547 | 6 | $1,988 +999 | 7 | $2,130 +1,129 | 9 | $1,484 +96 | 5 | $1,260 +615 | 9 | $1,822 +1,165 |
| 5:30 PM | 6 | $1,813 +734 | 6 | $1,924 +794 | 7 | $2,361 +1,264 | 6 | $2,430 +1,212 | 7 | $1,889 +869 | 8 | $1,360 +1,014 | 10 | $1,434 +659 |
| 6:00 PM | 1 | $1,803 -596 | 1 | $2,036 +1,126 | 1 | $2,581 +1,288 | 1 | $2,722 +1,288 | 1 | $2,413 +1,288 | 2 | $1,167 | 2 | $1,115 |
| 6:30 PM | 5 | $1,793 +524 | 6 | $2,186 +776 | 7 | $2,477 +1,298 | | $2,484 +1,198 | 5 | $1,823 +736 | 2 | $1,380 | | $1,242 +499 |
| 7:00 PM | 5 | $4,961 +3,627 | 4 | $4,812 +3,479 | 3 | $5,688 +1,288 | 5 | $4,394 +3,161 | 4 | $4,245 +3,234 | 8 | $2,065 | 2 | $1,468 |
| 7:30 PM | 6 | $5,688 +4,462 | 6 | $5,313 +3,925 | 4 | $7,035 +1,288 | 4 | $5,194 +3,537 | 5 | $4,788 +3,021 | 1 | $2,654 +1,927 | 1 | $3,400 +2,000 |
| 8:00 PM | | $4,562 +1,562 | 1 | $4,113 +763 | 2 | $7,480 | 1 | $3,820 | | $1,656 -1,393 | 1 | $3,130 +270 | 1 | $5,409 +2,909 |
| 8:30 PM | 1 | $4,957 +1,757 | 1 | $4,042 +842 | 2 | $7,831 | 1 | $4,106 +906 | 1 | $1,410 -1,590 | 1 | $2,785 -415 | 1 | $5,931 +5,900 |
| 9:00 PM | 1 | $6,995 +3,994 | 1 | $2,818 +582 | 2 | $8,106 | 1 | $8,019 +5,018 | 2 | $2,066 | 1 | $2,953 -46 | 1 | $4,331 +2,981 |
| 9:30 PM | 2 | $7,154 +3,754 | 2 | $2,079 -1,054 | 1 | $8,911 +1,288 | 1 | $5,275 +2,274 | 3 | $2,584 | 1 | $3,120 +1,920 | 3 | $5,065 |
| 10:00 PM | 1 | $5,375 +2,575 | 1 | $3,799 +799 | 1 | $6,982 +4,182 | 1 | $4,747 +246 | 2 | $2,742 | 1 | $4,371 +2,651 | 1 | $4,924 +1,923 |

(Rates are EU30s)

FIG.18

Demand Listing

Channel: KCPQ
Week: 04/06/2015

| | Channel | Advertiser | Creative Title | Creative Id | Agency | Week ↑ | Days | Start Time | End Time | # of Offers | Unit Length | Rate | EU :30 Rate |
|---|---|---|---|---|---|---|---|---|---|---|---|---|---|
| ✎ | KCPQ | Dunkin Don.... | QA-Transisti... | WOCMP-37... | Omega Mar... | 04/06/15 | ---S--- | 5:00 PM | 5:30 PM | 1 | :30 | $116.90 | $116.90 |
| ✎ | KCPQ | Dunkin Don.... | QA-Transisti... | WOCMP-37... | Omega Mar... | 04/06/15 | -T----- | 6:00 AM | 10:00 AM | 8 | :30 | $35.13 | $35.13 |
| ✎ | KCPQ | Thompson.... | BugBashSm... | WOCMP-37... | Omega Mar... | 04/06/15 | ---S--- | 5:00 XM | 6:00 XM | 2 | :30 | $1,049.40 | $1,049.40 |
| ✎ | KCPQ | Thompson.... | BugBashSm... | WOCMP-37... | Omega Mar... | 04/06/15 | -T----- | 10:00 AM | 10:30 PM | 25 | :30 | $493.80 | $493.80 |
| ✎ | KCPQ | Dunkin Don.... | QA-Transisti... | WOCMP-37... | Omega Mar... | 04/06/15 | --T---- | 6:00 AM | 10:30 PM | 33 | :30 | $16.27 | $16.27 |
| ✎ | KCPQ | Thompson.... | BugBashSm... | WOCMP-37... | Omega Mar... | 04/06/15 | ----F-- | 5:30 PM | 8:00 PM | 5 | :30 | $2,795.04 | $2,795.04 |
| ✎ | KCPQ | Dunkin Don.... | QA-Transisti... | WOCMP-37... | Omega Mar... | 04/06/15 | ----F-- | 6:00 AM | 1:30 PM | 15 | :30 | $21.04 | $21.04 |
| ✎ | KCPQ | Thompson.... | BugBashSm... | WOCMP-37... | Omega Mar... | 04/06/15 | M------ | 10:30 AM | 8:00 PM | 19 | :30 | $1,297.20 | $1,297.20 |

┌─────────────────────────────────────────────────────────────┐
│  Review Credit: Advertiser A                            ⊗   │
│                                                             │
│                         ┌─────┐  ▢▢                         │
│                         │  ⓘ  │  ▢☑                         │
│                         │Details│ Approvals                 │
│                         └─────┘                             │
│                                         2302        2304    │
│   Name:                              CREDIT LIMIT  CREDIT AVAILABLE │
│   Advertiser A                       $130,200.00  $130,200.00│
│                                                             │
│     2306                                    2308            │
│   STATUS                                  DAYS OUTSTANDING  │
│   Varies                                              0     │
│   10 approvals out of 10 responding marketplace channels    │
│                                                             │
│      2310                                                   │
│   ADVERTISER CATEGORIES                    LAST UPDATED     │
│    Hobbies & Interests  Art/Technology    19/29/2015 8:30 AM│
│    Travel  Adventure Travel                                 │
│                                                             │
│     2312           2314                                     │
│   AGENCY OF RECORD FORM   CREDIT APPLICATION                │
│         ⁄⁄                    ⁄⁄                            │
│                                                             │
│                                      ┌──────┐  ┌────────┐  │
│                                      │ SAVE │  │ CANCEL │  │
│                                      └──────┘  └────────┘  │
└─────────────────────────────────────────────────────────────┘

SYSTEMS, METHODS AND ARTICLES TO FACILITATE INTEROPERABILITY BETWEEN ADVERTISING INVENTORY CHANNELS

BACKGROUND

Field

This disclosure generally relates to computer-implemented systems and methods which facilitate the interoperability between advertising inventory channels.

Description of the Related Art

Content providers such as radio stations and networks, television stations and networks, and Webcasters provide programming including content which is the subject of programming. Content providers' delivery of content is often via broadcasts or Webcasts (collectively, "mediacasts"). While content providers may employ repeaters and the like, broadcasts are typically limited in range to a geographic region.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Given that most broadcasts are local in nature or extent, content providers often carry advertisements and other material which is of a somewhat local or parochial interest. For example, a local chain may place advertisements with a local broadcaster since the audience targeted by the local chain is also often local and local advertising tends to be less expensive than regional or national advertising.

Real-time bidding technology allows advertisers to buy only the digital inventory they want through an automatic auction pricing mechanism, performed on an impression-by-impression basis. The promise of real-time bidding is to make every digital impression cost effective for advertisers, by providing them with details about the current ad viewer, and letting the advertisers define the price they would be willing to pay to be placed at the right time in front of this viewer. Real-time bidding is typically implemented on Demand Side Platforms (DSP) bidding on behalf of buyers, and on Sell Side Platforms (SSP) running auctions on digital inventory and electing winners. The emerging industry standard for Real-time bidding is named OpenRTB.

New approaches that automate the various activities related to buying, selling and placement of new materials, for instance, advertisements, in mediacasts are desirable.

BRIEF SUMMARY

A system to automate advertisement placement in linear mediacasts may be summarized as including at least one nontransitory processor-readable storage medium that stores an inventory of advertisement placement opportunities to place advertisements in at least one of a number of linear mediacasts for each of a plurality of mediacast content providers that transmit the mediacasts to a plurality of media consumers, each of the advertisement placement opportunities represented in a canonical form that specifies at least a respective period of time of the advertisement placement opportunity during a mediacast day of the mediacast content provider; and at least one processor communicatively coupled to the at least one nontransitory processor-readable storage medium and which implements a real-time bidding interface that sends requests for real-time bids for each of the advertisement placement opportunities to real-time bidding systems associated with advertisers via at least one data communication channel, and that, responsive to sending the requests, receives real-time bids for advertisement placement opportunities from one or more real-time bidding systems associated with advertisers via the at least one data communication channel. Each of the advertisement placement opportunities may include a plurality of slots in the respective period of time of the advertisement placement opportunity.

For each mediacast content provider, the at least one processor may implement a real-time bidding interface which may send requests for real-time bids for each of the advertisement placement opportunities for periods of time which span an entire mediacast period of time for the mediacast content provider. The mediacast period of time for the mediacast content provider may include a plurality of consecutive mediacast days beginning on a day which is after the day on which the requests for real-time bids are sent to the advertisers. The mediacast period of time for the mediacast content provider may include seven consecutive mediacast days beginning on a day which is one week after the day on which the requests for real-time bids are sent to the advertisers. The at least one processor may implement a real-time bidding interface which may send requests for real-time bids which are formatted to comply with a standard protocol utilized by advertisers for real-time bidding on digital advertisement placement opportunities. The at least one processor may implement a real-time bidding interface which may receive creative information formatted to comply with a standard protocol utilized by advertisers for serving video advertisements over a communications channel. The at least one processor may implement a real-time bidding interface which may send notifications to advertisers indicating that a purchased advertisement spot has aired. The at least one processor may implement a real-time bidding interface which may send notifications to advertisers indicating that a purchased advertisement spot has aired, the notifications formatted to comply with a standard protocol utilized by advertisers for serving video advertisements over a communications channel. The at least one processor may implement a real-time bidding interface which may send notifications to the advertisers indicating win/loss outcomes for real-time bids submitted by the advertisers. The at least one processor may implement a real-time bidding interface which may send daily notifications to the advertisers indicating win/loss outcomes for real-time bids submitted by the advertisers. The at least one processor may implement the real-time bidding interface which may receive a plurality of bids from an advertiser and may receive an advertiser-specified budget which spans the received plurality of bids, each of the plurality of bids specifying a respective bid price and the sum of the bid prices of the plurality of bids exceeds the advertiser-specified budget, the at least one processor may prevent acceptance of bids from the advertiser once the advertiser-specified budget for the plurality of bids is exceeded by acceptance by the mediacast content providers of other bids by the advertiser for the received plurality of bids. The received plurality of bids may include bids from an advertiser for all advertisement placement opportunities which meet one or more criteria specified by the advertiser.

The advertiser-specified budget may span at least two media types including television, radio, or digital placement of media.

The at least one processor may implement the real-time bidding interface which may receive a plurality of bids from an advertiser and may receive an advertiser-specified maximum concentration which spans the received plurality of bids, the at least one processor may prevent acceptance of bids from the advertiser once the advertiser-specified maximum concentration for the received plurality of bids is exceeded by acceptance by the mediacast content providers of other bids by the advertiser for the received plurality of bids. The maximum concentration may include a maximum number of acceptances with respect to at least one of a market, an affiliate, a period of time, a media outlet, a geographical area, or a group of consumers. The at least one processor may implement the real-time bidding interface which may receive real-time bids for advertisement placement opportunities from one or more advertisers via the at least one data communication channel within one second of when corresponding requests for bids are sent. The at least one processor may implement an advertiser-facing interface which may receive requests for creative ingestion from one or more advertisers via the at least one communication channel. The at least one processor may implement an advertiser-facing interface which may receive requests for a validity status of a creative from one or more advertisers via the at least one communication channel. The at least one processor may implement the real-time bidding interface which may send requests for real-time bids for each of the advertisement placement opportunities to advertisers via at least one data communication channel, each of the requests for real-time bids specifies at least one of: an auction type, a maximum amount of time allowed to submit a bid, channel information, device information, or user information. The at least one processor may implement the real-time bidding interface which may receive real-time bids for advertisement placement opportunities from one or more advertisers via the at least one data communication channel, and each real-time bid may specify at least one of: a bid price, an advertising campaign constraint, or an identification of the entity which sent the bid. The at least one processor may implement the real-time bidding interface which may receive a plurality of bids for advertisement placement opportunities from an advertiser, such bids may be targeted based at least in part on at least one of: geographic location, channel, time of day, or viewer demographics.

For at least one of the advertisement placement opportunities in the inventory, the canonical form may specify the respective period of time of the advertisement placement opportunity by at least two of: i) a start time of the respective advertisement placement opportunity, ii) an end time of the respective advertisement placement opportunity, and iii) a duration of the respective advertisement placement opportunity. For at least one of the advertisement placement opportunities in the inventory, the canonical form may further specify a day of the week of the advertising placement opportunity. The specified period of time for at least some of the advertisement placement opportunities may include thirty minutes.

A method to automate advertisement placement in linear mediacasts may be summarized as including storing, in at least one nontransitory processor-readable storage medium, an inventory of advertisement placement opportunities to place advertisements in at least one of a number of linear mediacasts for each of a plurality of mediacast content providers that transmit the mediacasts to a plurality of media consumers, each of the advertisement placement opportunities represented in a canonical form that specifies at least a respective period of time of the advertisement placement opportunity during a mediacast day of the mediacast content provider; sending, via a real-time bidding interface implemented by at least one processor communicatively coupled to the at least one nontransitory processor-readable storage medium, requests for real-time bids for each of the advertisement placement opportunities to advertisers via at least one data communication channel; and responsive to sending the requests, receiving, by the at least one processor via the real-time bidding interface, real-time bids for advertisement placement opportunities from one or more advertisers via the at least one data communication channel. Receiving real-time bids for advertisement placement opportunities may include receiving real-time bids for advertisement placement opportunities which each include a plurality of slots in the respective period of time of the advertisement placement opportunity, at least some of the plurality of slots may have a duration shorter than the specified period of time of the respective advertising placement opportunity.

For each mediacast content provider, sending requests for real-time bids for each of the advertisement placement opportunities may include sending requests for real-time bids for each of the advertisement placement opportunities for periods of time which span an entire mediacast period of time for the mediacast content provider.

For each mediacast content provider, sending requests for real-time bids for each of the advertisement placement opportunities may include sending requests for real-time bids for each of the advertisement placement opportunities for periods of time which span a plurality of consecutive mediacast days beginning on a day which is after the day on which the requests for real-time bids are sent to the advertisers.

For each mediacast content provider, sending requests for real-time bids for each of the advertisement placement opportunities may include sending requests for real-time bids for each of the advertisement placement opportunities for periods of time which include seven consecutive mediacast days beginning on a day which is one week after the day on which the requests for real-time bids are sent to the advertisers. Sending requests for real-time bids for each of the advertisement placement opportunities may include sending requests for real-time bids which may be formatted to comply with a standard protocol utilized by advertisers for real-time bidding on digital advertisement placement opportunities.

The method may further include receiving creative information formatted to comply with a standard protocol utilized by advertisers for serving video advertisements over a communications channel.

The method may further include sending, via the real-time bidding interface, notifications to advertisers indicating that a purchased advertisement spot has aired.

Sending notifications to advertisers indicating that a purchased advertisement spot has aired may include sending notifications to advertisers indicating that a purchased advertisement spot has aired, the notifications formatted to comply with a standard protocol utilized by advertisers for serving video advertisements over a communications channel.

The method may further include sending, via the real-time bidding interface, notifications to the advertisers indicating win/loss outcomes for real-time bids submitted by the advertisers. Sending notifications to the advertisers indicating win/loss outcomes for real-time bids may include sending daily notifications to the advertisers indicating win/loss outcomes for real-time bids submitted by the advertisers.

Receiving real-time bids via the real-time bidding interface may include receiving a plurality of bids from an advertiser and receiving an advertiser-specified budget which spans the received plurality of bids, each of the plurality of bids specifying a respective bid price and the sum of the bid prices of the plurality of bids exceeds the advertiser-specified budget, and the method may further include preventing acceptance of bids from the advertiser once the advertiser-specified budget for the plurality of bids is exceeded by acceptance by the mediacast content providers of other bids by the advertiser for the received plurality of bids. Receiving a plurality of bids from an advertiser may include receiving a plurality of bids which may include bids from an advertiser for all advertisement placement opportunities which may meet one or more criteria specified by the advertiser. Receiving an advertiser-specified budget may include receiving an advertiser-specified budget which spans at least two media types including television, radio, or digital placement of media.

Receiving real-time bids via the real-time bidding interface may include receiving a plurality of bids from an advertiser and receiving an advertiser-specified maximum concentration which spans the received plurality of bids, and the method may further include preventing acceptance of bids from the advertiser once the advertiser-specified maximum concentration for the received plurality of bids is exceeded by acceptance by the mediacast content providers of other bids by the advertiser for the received plurality of bids. Receiving real-time bids via the real-time bidding interface may include receiving a plurality of bids from an advertiser and receiving an advertiser-specified maximum concentration which spans the received plurality of bids, the maximum concentration may include a maximum number of acceptances with respect to at least one of a market, an affiliate, a period of time, a media outlet, a geographical area, or a group of consumers.

The method may further include implementing a daily close of all requests for advertisement placement opportunities pertaining to a given mediacast day. Storing an inventory of advertisement placement opportunities may include storing an inventory of advertisement placement opportunities and, for at least one of the advertisement placement opportunities in the inventory, the specified period of time for at least some of the advertisement placement opportunities may include thirty minutes. Storing an inventory of advertisement placement opportunities may include storing an inventory of advertisement placement opportunities and, for at least one of the advertisement placement opportunities in the inventory, the canonical form may specify the respective period of time of the advertisement placement opportunity by at least two of: i) a start time of the respective advertisement placement opportunity, ii) an end time of the respective advertisement placement opportunity, and iii) a duration of the respective advertisement placement opportunity.

Storing an inventory of advertisement placement opportunities may include storing an inventory of advertisement placement opportunities and, for at least one of the advertisement placement opportunities in the inventory, the canonical form may further specify at least one of: a channel or a day of the week of the advertising placement opportunity.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 6 shows a method of operating an advertisement marketplace computer system, according to one illustrated implementation, which may be employed in performing the method of FIG. 4.

FIG. 7 shows a method of operating an advertisement marketplace computer system, according to one illustrated implementation, which may be employed in performing the method of FIG. 4.

FIG. 8 shows a method of operating an advertisement marketplace computer system, according to one illustrated implementation, which may be employed in performing the method of FIG. 4.

FIG. 13 is a screenshot of a new direct response avail window of a seller console which allows a seller to define a new direct response avail time, according to one illustrated implementation.

FIG. 14 is a screenshot of a new accept rule window of a seller console which includes a description tab and a rule items tab, according to one illustrated implementation.

FIG. 15 is a screenshot of a creative area window of a seller console which provides a view of creatives, according to one illustrated implementation.

FIG. 16 is a screenshot of a dashboard window of a seller console which shows a plurality of offers, according to one illustrated implementation.

FIG. 17 is a screenshot of a calendar area window of a seller console which shows a color-coded calendar-based heat map for a number of offers, according to one illustrated implementation.

FIG. 18 is a screenshot of the calendar area window of FIG. 17 which depicts selection of a plurality of offers to be accepted as rotators, according to one illustrated implementation.

FIG. 19 is a screenshot of a rotations area window of a seller console which displays a list of offers submitted by buyers for a selected channel and day, according to one illustrated implementation.

FIG. 23 is a screenshot of a review credit window of a seller console which provides details for an advertiser including credit limit, credit available, status information, days outstanding, advertiser categories, an agency of record form icon, and a credit application icon, according to one illustrated implementation.

FIG. 28 shows a screenshot of a graphical user interface which allows a buyer to target bids for a campaign based on geographic location, according to one illustrated implementation.

FIG. 30 shows a screenshot of a graphical user interface which allows a buyer to target bids for a campaign based on day parts, according to one illustrated implementation.

DETAILED DESCRIPTION

Figure 1:
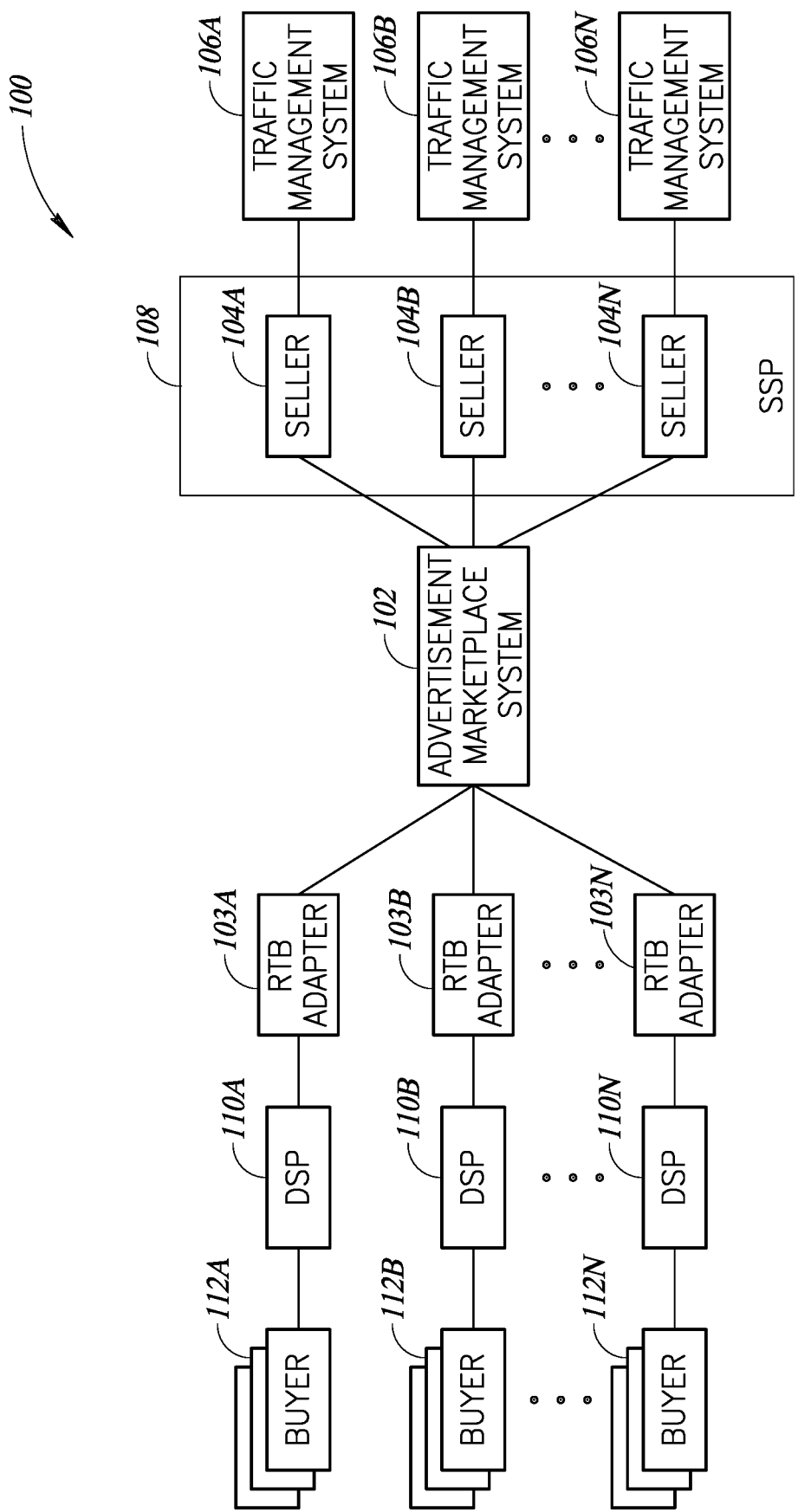
FIG. 1 is a schematic diagram of a networked environment, including an advertisement marketplace computer system communicatively coupled between sellers, such as terrestrial radio or television providers or Webcasters, and buyers, such as advertisers who have advertisements to place or who otherwise control placement of advertisements, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The headings and Abstract of the Disclosure provided herein are for convenience only and do not interpret the scope or meaning of the implementations.

Implementations of the present disclosure are directed to computer-implemented systems and methods for providing an autonomous advertisement marketplace or exchange system where buyers and sellers can trade mediacast (e.g., broadcast, Webcast) advertisement inventory programmatically at local, national, and/or worldwide levels. The types of media traded via the marketplace may simultaneously include numerous types of media, including TV, cable, satellite, radio, outdoor, print, etc. Such programmatic advertising implements data-driven automation of audience-based advertising operations which inverts the industry standard in which marketers rely on show ratings to determine desirable audiences for the marketers' advertisements. Instead, with programmatic, marketers may use audience data to pipe advertising to optimal places. For example, marketers may use programmatic technology to reach a more specific set of consumers regardless of the programs on which the advertisements appear.

The marketplace systems disclosed herein seamlessly blend traditional linear media (e.g., TV, cable, satellite, radio, outdoor, print) sales practices with data-driven digital advertisement buying methods. In some implementations, the marketplace systems are fully automated seller-controlled marketplace systems which connect linear mediacasters (e.g., broadcasters, Webcasters) with new and existing demand sources and offer revenue management tools for optimizing yields across direct and programmatic channels. Transactions may be demand-led, which allows sellers to view the demand across the sellers' entire landscape of potentially available advertisement inventory. Further, in some implementations, the sellers may autonomously accept or reject bid responses from buyers without revealing price floors or available advertisement opportunities to any of the buyers.

In some implementations, the advertisement marketplace systems disclosed herein may include a real-time bidding interface which facilitates operation with digital demand side platforms that make automated media advertisement purchases. For instance, inventory units of linear advertising opportunities may be represented as "virtual impressions" for which requests for real-time bids are sent to digital demand side platforms, thus allowing digital advertisers access to linear advertisement opportunities. Participating sellers enjoy seamless transaction workflow for getting advertisements from proposal, to publishing, and to billing that delivers a significant reduction in time spent on reconciliation and "make-goods" and streamlines processes for creative management and revenue management across direct and programmatic sales channels. As used herein, "creative" refers the media asset associated with an advertisement (e.g., an image file, audio file, video file).

The marketplace systems may include a seller side platform (SSP) or seller console for sellers (e.g., broadcasters, Webcasters, printed content providers) and a real-time bidding (RTB) adapter or console which allows digital demand side platform (DSP) entities to interface with the marketplace systems. Thus, digital DSPs may access linear advertisement opportunities without significantly modifying their infrastructure. Through the SSP, sellers can access demand and make advertisement inventory available and accept or reject bid responses based on marketplace demand.

As discussed further below, the RTB adapter facilitates creative placement and reviewing for the buy side, and may have transcoding and approval tools for the sell side. For example, in some implementations, once an advertisement transaction is approved, the RTB adapter sends the advertisement directly to a broadcaster's traffic system. In some implementations, the marketplace system is a sell-side powered marketplace, which allows sellers to set price floors and to retain the right to accept or reject any offer which comes through the marketplace system.

In some implementations, the advertisement marketplace systems disclosed herein automate aspects of billing, reconciliation, and creative execution. In some implementations, the advertisement marketplace systems may be integrated with advertisement management software and sales and traffic management systems.

In one or more implementations disclosed herein, the marketplace systems do not require sellers to offer particular day parts or times when advertisement inventory is available. That is, "carve-outs" are not required. Rather, buyers can extend offers for the entire roster or landscape for a particular channel for a particular period of time (e.g., mediacast day, mediacast week). Thus, sellers may peruse this demand and decide which offers to accept or not to accept.

As discussed further below, in some implementations, the advertisement inventory is bought and sold as canonical inventory units which group similar but discrete advertisement slots together. For example, for linear media an inventory unit may be defined as a specific channel, day and time period (e.g., 30 minutes). When the marketplace opens for a given mediacast day, the marketplace may issue requests for bids (RFBs) for all inventory units for one or more mediacast days. Buyers may price the inventory units and provide a bid for any of the inventory units. At a daily market close, the advertisement marketplace may notify the buyers of the win/loss outcomes. In some implementations, the demand (e.g., bid responses) may be expressed for future slots but sellers may accept near publishing time (e.g., 10 seconds before airtime, 10 minutes before airtime).

As discussed further below, the SSPs disclosed herein allow mediacasters to evaluate an offer in the context of a market, then autonomously accept or reject the offer based on rules set by the mediacaster. Mediacasters need only accept offers which are right for their total business, including their yields across their entire inventory (e.g., linear, digital), their audience's experience, and the need to manage channel conflicts with other sales methods (e.g., direct sell).

Using the systems and methods discussed herein, mediacasters are able to accelerate revenue and advertising monetization through direct access to an ecosystem of buying partners and their advertising clients who demand local audiences. The systems and methods discussed herein allow mediacasters to control precisely what they choose to sell and to maximize revenue across their portfolio, and enables advertisers to achieve more impact and return on investment (ROI) by reaching their targeted audiences. Such features allow for increased revenue by providing seamless access to additional demand sources including national traditional buyers as well as digital buyers, which is seller-controlled through the SSP.

As discussed further below, the SSP of the marketplace system revolves around the broadcaster's SSP dashboard. Seller features in the SSP dashboard include pricing controls, support for rotators, and integrated credit approval. The SSP dashboard also allows sellers to preview and pre-approve the creative associated with marketplace offers. In some implementations, the SSP also incorporates an integrated payment service that automates the process of invoicing and collecting media fees.

As discussed below, one or more implementations of SSPs discussed herein include powerful yield management tools that give participating mediacasters the power to retain full control of pricing floors and inventory allocation across non-programmatic (e.g., direct) and programmatic sales channels. The SSP dashboard offers sellers an unprecedented view of marketplace demand with direct sold deals and avails along with placement and exclusion rules.

FIG. 1 shows a networked environment 100 according to one illustrated implementation in which various apparatus, methods and articles described herein may operate. The environment 100 includes an advertisement marketplace or exchange system 102, a real-time bidding (RTB) adapter 103, a number of sellers or content providers 104A-104N (collectively 104), traffic management systems 106A-106N (collectively 106), a supply side platform (SSP) 108, a number of demand side platforms (DSPs) 110A-110N (collectively 110), and a number of buyers 112A-112N (collectively 112), all communicatively coupled by one or more networks or other communications channels.

The sellers 104 may take a variety of forms, for example, radio stations or broadcasters, television stations or broadcasters, other terrestrial or satellite broadcasters or multicasters (not shown), Webcasters, printed content (e.g., print media) providers, outdoor content (e.g., billboards) providers, etc., or combinations thereof. The sellers 104 may, or may not, own the content that they provide. The sellers 104 utilize the SSP 108 to access the advertisement marketplace system 102 and may use the traffic management systems 106A-106N for traffic management. On the buy side, the buyers 112 (e.g., advertisers, agencies) may interface with the marketplace system 102 via the RTB adapter 103 through the buyers' respective DSPs 110.

Figure 2:
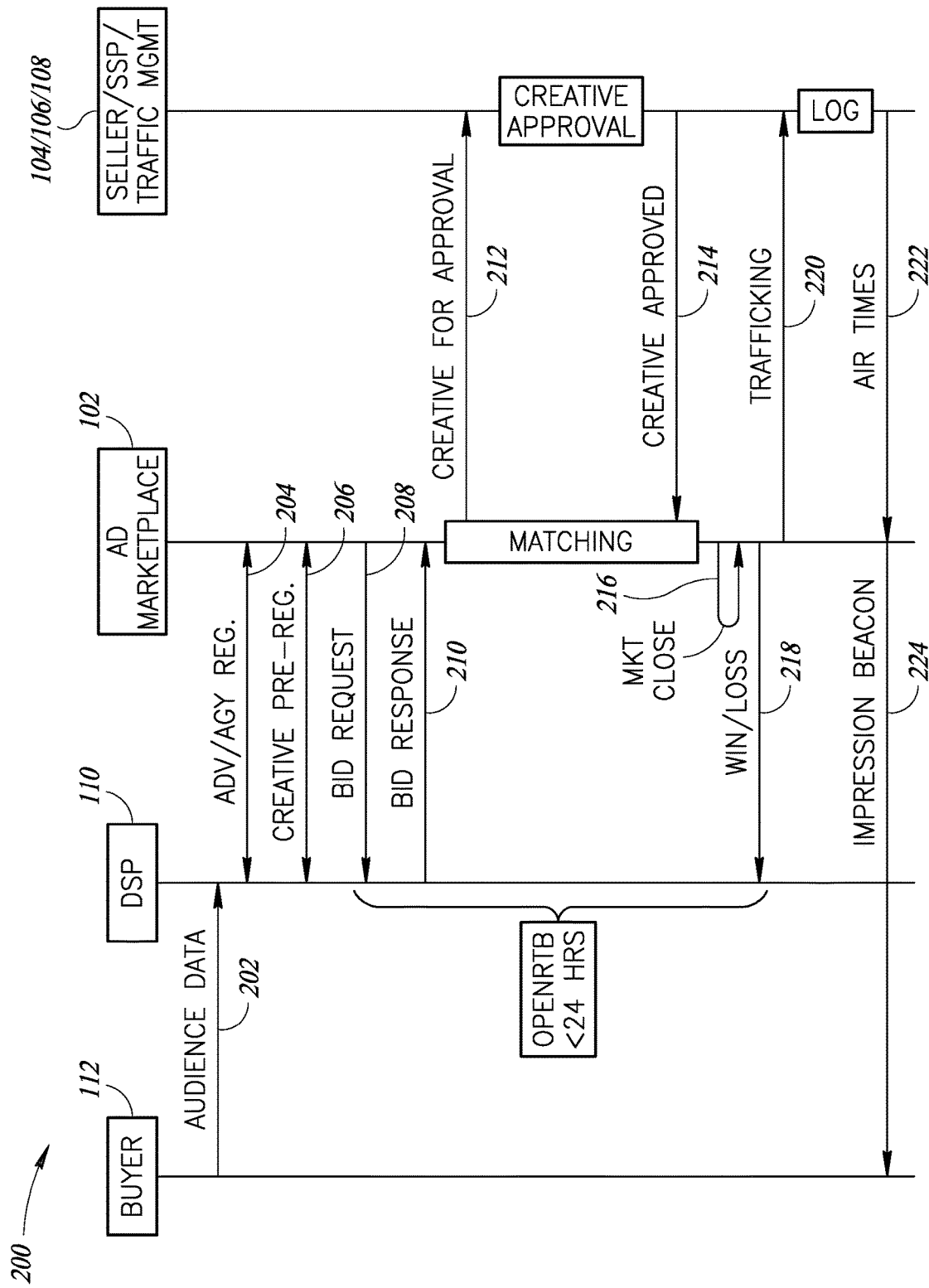
FIG. 2 is a workflow diagram of portions of the networked environment of FIG. 1, showing an example workflow for a transaction utilizing the advertisement marketplace computer system, according to one illustrated implementation.

FIG. 2 shows an example algorithm or workflow 200 for implementing the marketplace system 102 in the environment 100 of FIG. 1 between a buyer 112, a buyer's DSP 110 (e.g., digital DSP), the marketplace system 102, and a seller 104 interfacing with the marketplace system 102 through the SSP 108 and the traffic management system 106. Generally, the RTB adapter 103 exposes future advertisement inventory (avails) to DSPs which can bid on the entire supply landscape and receive daily win/loss notifications for the inventory (e.g., for the following week). The RTB Adapter may expose the inventory to DSPs via the OpenRTB protocol, for example, which allows digital DSPs to seamlessly access linear advertisement inventory.

At 202, the buyer 112 may enter advertising campaign constraints through the DSP 110. Such campaign constraints may include budget, target audience, channels, day parts, etc. (See FIGS. 28-32). The campaign constraints may be cross-media types (e.g., TV, cable, radio, satellite, outdoor, print). At 204, the buyer 112 may send an advertiser and/or agency name mapping to the advertisement marketplace 102 via the DSP 110 based on agencies and advertisers already existing in the advertisement marketplace so that the buyer is associated with an advertiser and/or agency name in the marketplace. At 206, a creative agency associated with the buyer 112 may upload a creative (e.g., advertisement content) which will be used in campaigns through the DSP 110. The DSP 110 may provision the creative to the advertisement marketplace 102, which may download, ingest and validate the creative, and may then send an identifier (e.g., "creative ID") back to the DSP for use in a subsequent bid response.

At 208, the advertisement marketplace 102 may send a request for bids (RFBs) to the DSP 110 for every canonical inventor unit. As noted above, in some implementations, a canonical inventory unit is defined as a time period in a mediacast period of time (e.g., mediacast day) for a particular channel and/or market (e.g., Channel X, Market Y, Nov. 3, 2015, 5:30-6:00 am). The advertisement marketplace system 102 may send RFBs for all canonical inventory units in the marketplace for a particular period of time (e.g., day, week). In some implementations, each inventory unit in the advertisement marketplace system has a unique channel, market, and time period combination. In some implementations, the advertisement marketplace system operates one week ahead of a publication date (e.g., airdate), but other future time windows may also be used.

At 210, the DSP 110 responds to the RFBs provided by the advertisement marketplace system 102 with demand for one or more of the inventory units. As discussed above, in the case of a DSP implementing and RTB system, the DSP may respond almost immediately (e.g., within 10 seconds, within 1 second, within 100 milliseconds). The DSP 110 may apply targeting criteria prior to issuing bids. In some implementations, the DSP 110 does not need to notify the advertisement marketplace system 102 of the targeting data source or attributes used to determine the bids or inventory unit selection.

At 212, the advertisement marketplace system 102 validates received bids and begins matching bids with inventory supply. At 214, the SSP 108 pulls creative previews and alerts the seller 104 to possible bids to approve. The seller may approve the creatives and bids and may then send the approvals to the advertisement marketplace system 102 for consideration.

At 216, the advertisement marketplace system 102 closes the marketplace for the day. The winning spots are sent to the traffic management system 106 for publishing (e.g., airing, printing). At 218, the advertisement marketplace system 102 may send a "win" beacon to the DSP 110, which allows the buyer 112 to decrement the buyer's budget through the DSP as needed.

At 220, the seller 104 may process orders through the traffic management system 106. At 222, the seller 104 may reconcile actual air times with the advertisement marketplace system 102 through the traffic management system 106.

At 224, the advertisement marketplace system 102 may send impression and completion event beacons to the buyer 112 through the DSP 110. Such beacons may be sent after the spot has aired (e.g., up to 30 days later). The advertisement marketplace system 102 may send the impression and completion event beacons from the Video Ad Serving Template (VAST) payload.

In some implementations, before a DSP can win bids, creative should be sent to the advertisement marketplace system 102 to be stored in a nontransitory processor-readable storage medium accessible thereby, such as a creative library or a VAST storage location specified in the bid. As noted above, when a creative is submitted by a DSP to the advertisement marketplace system 102 through the RTB adapter 103, an identifier is sent back to the DSP. Then, advertisement marketplace system 102 ingests the creative and validates that the creative assets meets the technical requirements necessary for the creative to be trafficked and aired successfully. In some implementations, creatives are pre-registered. In such cases, bid responses from DSPs designate a pre-registered creative identifier. Even in the case of creative pre-registration, the DSP may normally provide a VAST tag with impression and quartile beacons, or other creative information.

As an alternative to pre-registering creative, creative payloads or information may be specified using VAST in a response to an RFB. Creative requirements may be specified using the OpenRTB video object. In such instances, a winning bid's creative may be downloaded, ingested and delivered to the channel for airing.

As noted above, for linear media a canonical inventory unit may be defined a specific channel, market, day, and time period (e.g., half hour, one hour). Each canonical inventory unit may include a plurality (e.g., 12-18) of discrete advertisement slots which have a duration that is shorter than the specified time period for the inventory unit. For example, the durations for the advertisement slots may be 15 seconds, 30 seconds, 45 seconds, 60 seconds, 90 seconds, etc., while the specified time period for the canonical inventory unit may be 15 minutes, 30 minutes, 2 hours, etc. The precise time or position of these slots in the corresponding specified time period may or may not be defined at the time of a bid or known by the bidder. Even the seller may not know the precise time or the precise order of the slots prior to publication (e.g., broadcast).

When the marketplace opens for a particular mediacast day, RFBs are issued for all canonical inventory units for the mediacast day. Buyers are able to price the inventory units individually to provide spot bids. At the daily close of the marketplace, the advertisement marketplace system 102 notifies buyers 112 through respective DSPs 110 of the win/loss outcomes.

In cases of print media, a canonical inventory unit may be defined in a way such that similar but discrete advertisement slots are grouped together. For instance, for a daily newspaper, a canonical inventory unit may be defined by a section of the newspaper and by date (e.g., Sports section, May 3; Business section, May 6). In such instances, a seller may issue RFBs for all canonical inventory units in a future week of the newspaper.

The advertisement marketplace system 102 may operate on a mediacast day schedule, which may vary between sellers (e.g., mediacast stations). Most commonly, mediacast day is from 5:00 AM to 4:59 XM (the next calendar day). The time period from 12:00 AM to 4:59 AM is represented as 12:00 AM to 4:59 XM, wherein the XM indicates that the time period is actually part of the next calendar day.

In some implementations, the advertisement marketplace system 102 issues a unique RFB to the DSP 110 for every canonical inventory unit in the landscape (e.g., channels, markets) of the advertisement marketplace system for a particular future time period (e.g., one upcoming mediacast day). Once the RFBs are sent to the DSP 110, the DSP may have an opportunity each day to submit a bid for each inventory unit. The availability of inventory may not be revealed to the buyers in these bid requests.

In some implementations, the advertisement marketplace system 102 may perform a full landscape sweep on day X for inventory units containing spots which will air on the mediacast day one week later. For example, on a given Monday, the advertisement marketplace system 102 may issue RFBs for all inventory units covering the mediacast day for the next Monday. This window may be more or less than one week in other implementations.

In some implementations, the advertisement marketplace system 102 may allow DSPs to express demand (i.e., bids) for days beyond a single day one week ahead of the current day. For example, a DSP may wish to see RFBs on a rolling mediacast week basis. In such cases, the advertisement marketplace system 102 may issue RFBs on a given Monday for all canonical inventory units for the next Monday through the next Sunday. Then, on Tuesday of the same week, the advertisement marketplace system 102 may issue RFBs for all canonical inventory units for the next Tuesday through the next Monday, and so on. This configuration allows the DSP 110 to have more chances to bid on inventory units throughout the week, which can help fine tune bidding strategies and may facilitate campaign pacing.

Once all of the daily bids are collected, the advertisement marketplace system 102 matches offers with inventory supply and generates orders that are integrated with the traffic management system 106. At this point, the bid status for each bid may be classified as Win, Loss, or Hold. The Win bid status indicates the offer has been accepted by seller for a specific canonical inventory unit. The Loss bid status indicates the offer was declined by seller, and may specify one or more loss reason codes. The Hold bid status indicates the offer has been accepted by the seller as part of a rotator. In some implementations, all bids in a rotator are set to the lowest bid rate in a particular grouping.

In the event of a loss, a loss reason code may be provided. Such codes may include, for example: General Loss; Creative out of Specification (note this should be rare for successfully pre-registered creative); Provisioning Failure—AdvertiserID or AgencyID unknown; Creative rejected; Marketplace Closed for Airdate; and Bid Group Cap hit. Aired spots may be communicated back to DSP 110 using tracking beacons that come from the VAST tag.

Given the nature of the advertisement marketplace system 102 operations, budget management may be more complex than in a digital advertisement ecosystem. To facilitate budget management and to assist DSPs with expressing enough demand to meet their campaign objectives given the challenges introduced by the bid feedback latency, the advertisement marketplace system 102 may utilize "bid group objects." Each bid response can include a bid group object. A bid group object is a budget cap and/or a maximum spot wins constraint that can be assigned across multiple bids (and multiple media types) to avoid over-spending/over-winning during the feedback window. These budget caps and/or maximum spot wins may operate in a "first triggered" model, meaning that no more bids will be permitted to win after the budget cap or maximum spots cap are hit.

For example, the DSP 110 may group all bids for one campaign, for one day, into a bid group with a budget cap for the day. Then, the DSP 110 may issue bids for orders of magnitude more inventory and/or cost (e.g., $1,000,000) than the budget (e.g., $10,000) will support. The budget cap protects the buyer from winning all of the bids, which would exceed the budget. Thus, a buyer may issue bids as though the buyer has an "infinite budget" without the risk of exceeding the buyer's actual budget. Using such functionality, buyers can place bids in parallel without having to iteratively place bids, wait and see which bids are accepted, and place additional bids to fulfill their budget for a campaign. Such functionality also avoids the need for buyers to model acceptance rates to determine how much over the budget the buyer can safely bid without exceeding the budget. Depending on the accuracy of such model of acceptance rates and how aggressive a buyer is placing bids, there is the potential for the buyer to exceed the budget if the actual acceptance rate is higher than expected or for less than the budget to be spent if the actual acceptance rate is lower than expected. Such issues are avoided by use of the bid groups discussed above.

As another example, the DSP 100 may group all bids for a particular channel into a bid group object and set a maximum spot cap which limits the number of spots which will be purchased for the channel. Such feature may allow for "smoothing" a campaign across multiple channels and/or times without overly concentrating the buyer's budget on a particular market, affiliate, period of time, media outlet, geographical area, group of consumers, etc. As an example, a maximum spot cap may be established which limits the frequency which an advertisement is provided to the same group of consumers. The group of consumers may be determined statistically (e.g., by station times, programming) so that a particular advertisement is not provided to the same group of consumers more than N times over a time period.

Figure 3:
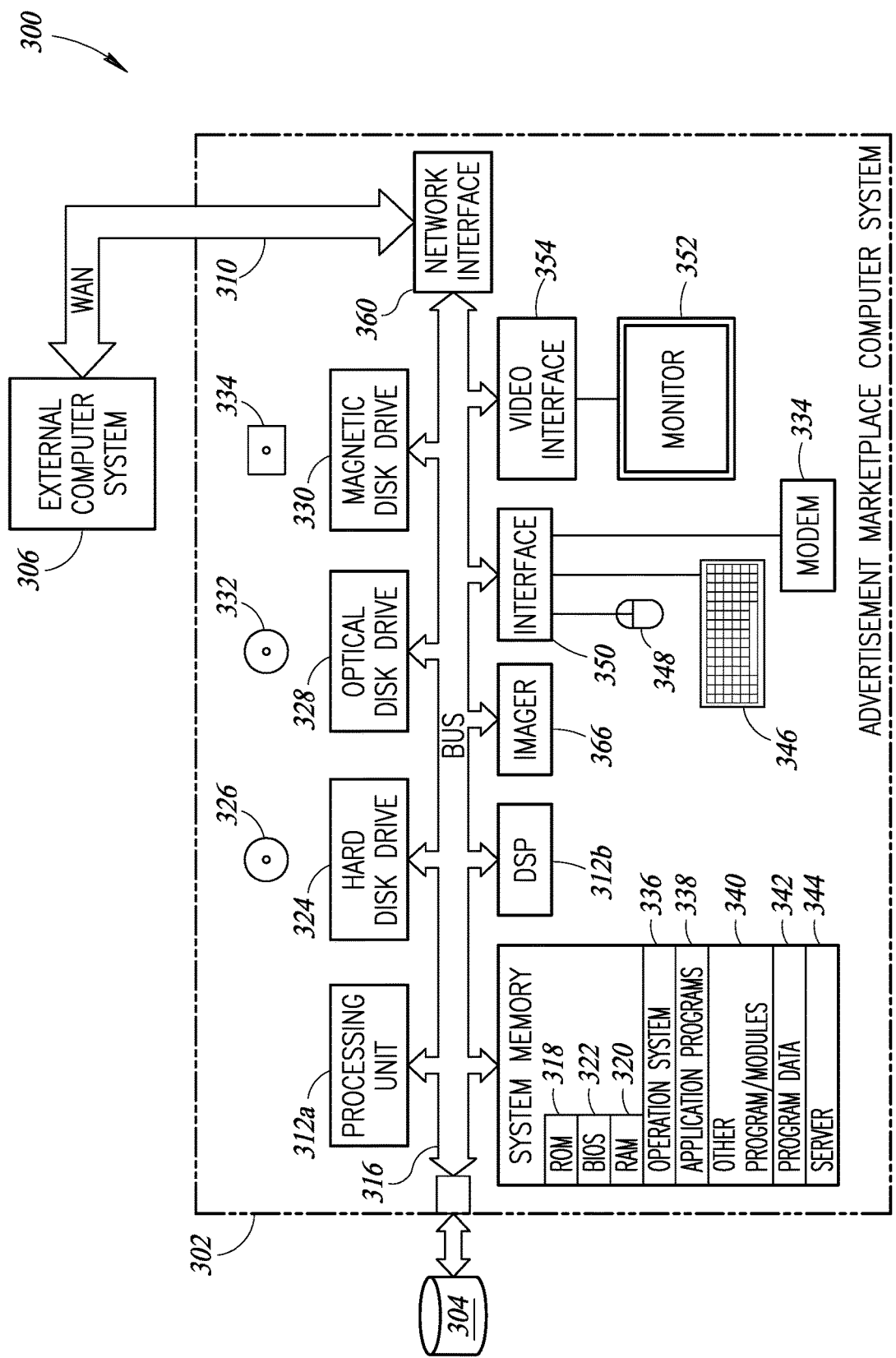
FIG. 3 is a schematic diagram of various components of an advertisement marketplace computer system, according to one illustrated implementation.

FIG. 3 shows a networked environment 300 comprising one or more advertisement marketplace computer systems 302 (only one illustrated) and one or more associated nontransitory computer- or processor-readable storage medium 304 (only one illustrated). The associated nontransitory computer- or processor-readable storage medium 304 is communicatively coupled to the advertisement marketplace computer system(s) 302 via one or more communications channels, for example, one or more parallel cables, serial cables, or wireless channels capable of high speed communications, for instance, via FireWire®, Universal Serial Bus® (USB) 2 or 3, Thunderbolt®, and/or Gigabit Ethernet®.

The networked environment 300 also includes one or more external processor-based computer systems 306 (only one illustrated). For example, the external processor-based systems 306 may be representative of a processor-based system associated with an SSP 108 or a DSP 110 of FIG. 1. The external processor-based systems 306 are communicatively coupled to the advertisement marketplace computer system(s) 302 by one or more communications channels, for example, one or more wide area networks (WANs) 310, for instance the Internet or Worldwide Web portion thereof.

The networked environment 300 may employ other computer systems and network equipment, for example, additional servers, proxy servers, firewalls, routers and/or bridges. The advertisement marketplace computer systems 302 will at times be referred to in the singular herein, but this is not intended to limit the implementations to a single device since in typical implementations there may be more than one advertisement marketplace computer systems 302 involved. Unless described otherwise, the construction and operation of the various blocks shown in FIG. 3 are of conventional design. As a result, such blocks need not be described in further detail herein, as they will be understood by those skilled in the relevant art.

The advertisement marketplace computer systems 302 may include one or more processing units 312a, 312b (collectively 312), a system memory 314 and a system bus 316 that couples various system components, including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the advertisement marketplace computer system(s) 302, such as during start-up.

The advertisement marketplace computer systems 302 may include a hard disk drive 324 for reading from and writing to a hard disk 326, an optical disk drive 328 for reading from and writing to removable optical disks 332, and/or a magnetic disk drive 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processing unit 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the advertisement marketplace computer system 302. Although the depicted advertisement marketplace computer systems 302 is illustrated employing a hard disk 324, optical disk 328 and magnetic disk 330, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 314, such as an operating system 336, one or more application programs 338, other programs or modules 340 and program data 342. The system memory 314 may also include communications programs, for example, a server 344 that causes the advertisement marketplace computer system 302 to serve electronic information or files via the Internet, intranets, extranets, telecommunications networks, or other networks as described below. The server 344 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 3 as being stored in the system memory 314, the operating system 336, application programs 338, other programs/modules 340, program data 342 and server 344 can be stored on the hard disk 326 of the hard disk drive 324, the optical disk 332 of the optical disk drive 328 and/or the magnetic disk 334 of the magnetic disk drive 330.

An operator can enter commands and information into the advertisement marketplace computer system(s) 302 through input devices such as a touch screen or keyboard 346 and/or a pointing device such as a mouse 348, and/or via a graphical user interface. Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The advertisement marketplace computer system(s) 302 can include other output devices, such as speakers, printers, etc.

The advertisement marketplace computer systems 302 can operate in a networked environment 300 using logical connections to one or more remote computers and/or devices. For example, the advertisement marketplace computer systems 302 can operate in a networked environment 300 using logical connections to one or more external processor-based systems 306. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the advertisement marketplace computer systems 302 and external processor-based systems 306.

Figure 4:
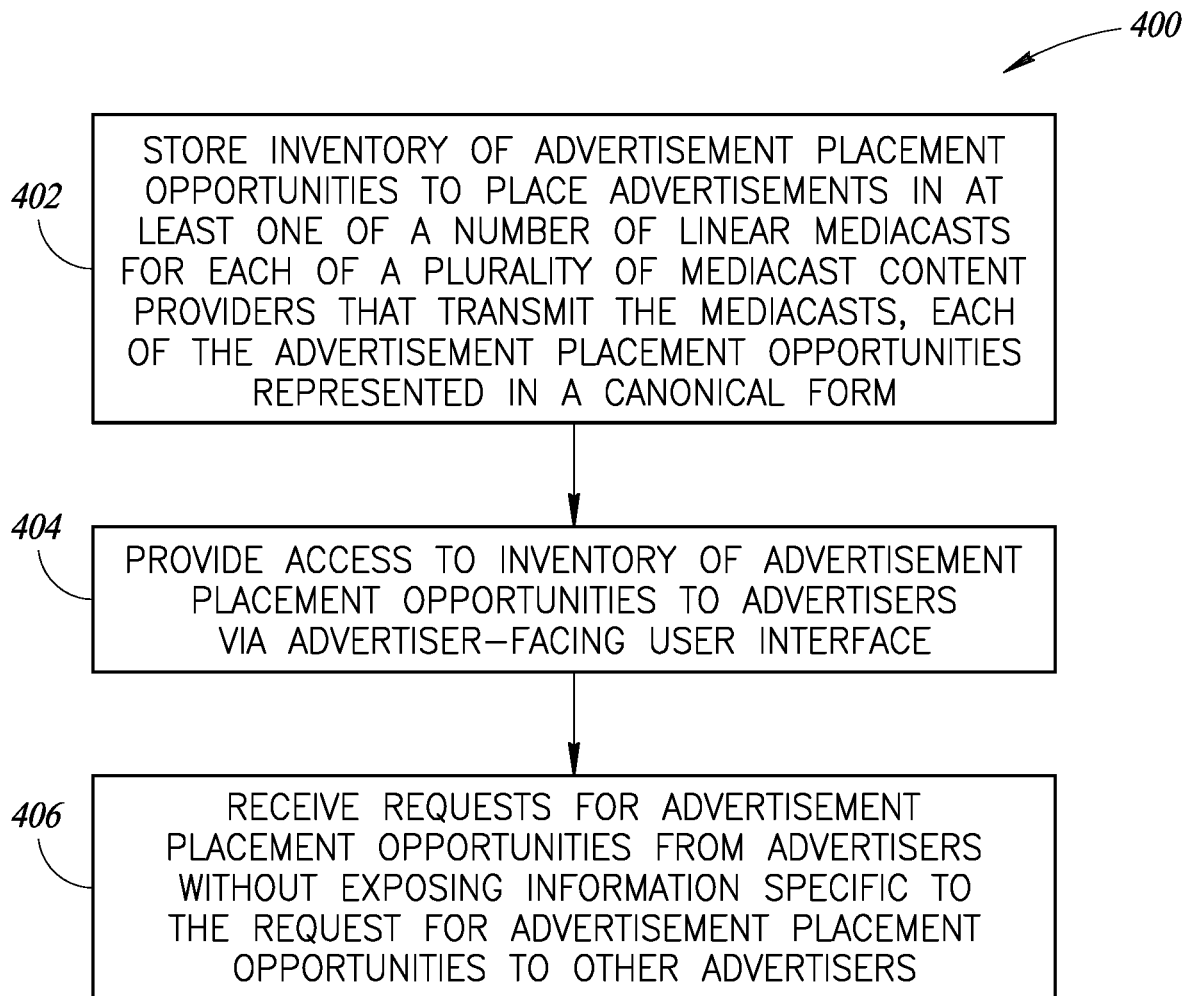
FIG. 4 shows a method of operating an advertisement marketplace computer system to automate placement of advertisements in linear mediacasts, according to one illustrated implementation.

FIG. 4 shows a method 400 of operating an advertisement marketplace computer system to automate advertisement placement in linear mediacasts (e.g., broadcasts, Webcasts). At 402, at least one processor of the advertisement marketplace system may store, in at least one nontransitory processor-readable storage medium thereof, an inventory of advertisement placement opportunities to place advertisements in at least one of a number of linear mediacasts for each of a plurality of mediacast content providers that transmit the mediacasts.

Each of the advertisement placement opportunities ("avails") may be represented in a canonical form that specifies at least a respective period of time (e.g., 15 minutes, 30 minutes, 1 hour) of the advertisement placement opportunity during a mediacast day of the mediacast content provider. For example, each inventory unit may correspond to a specific 30 minute window of a mediacast day of the mediacast content provider. Each of the advertisement placement opportunities may include a plurality (e.g., 12-18) of slots in the respective period of time of the advertisement placement opportunity. In some implementations, at least some of the plurality of slots have a duration shorter than the specified period of time of the respective advertising placement opportunity.

In some implementations, the canonical form of at least some of the advertisement placement opportunities in the inventory specifies the respective period of time of the advertisement placement opportunity by at least two of: i) a start time of the respective advertisement placement opportunity, ii) an end time of the respective advertisement placement opportunity, and iii) a duration of the respective advertisement placement opportunity. In some implementations, the canonical form of at least some of the advertisement placement opportunities in the inventory specifies a day of the week of the advertising placement opportunity. The canonical form of at least some of the advertisement placement opportunities in the inventory may specify at least one of a network, a network affiliate, or a channel of the advertising placement opportunity. In some implementations, the canonical form represents the advertising placement opportunity without specification of any asking price by the mediacast content provider for any slot in the respective advertising placement opportunity. In some implementations, the canonical form of at least some of the advertisement placement opportunities in the inventory represents the advertising placement opportunity without specification of either a specific start time or a specific end time for any of the respective slots of the advertising placement opportunity.

In some instances, the canonical form of inventory units may vary based on media type. For instance, TV, satellite, cable and outdoor billboards may utilize a canonical form defined by time period (e.g., 30 minutes), while print media may utilize a canonical form defined by sections (e.g., table of contents, feature article, back cover) of a publication and/or defined by two dimensional areas (e.g., ½ page, 1 page) of a publication.

At 404, the at least one processor of the advertisement marketplace system may provide access to the inventory of advertisement placement opportunities to advertisers via an RTB adapter. As discussed above, DSPs may access the RTB adapter to view inventory units across a media content provider's landscape for a particular period of time (e.g., a mediacast day). In some implementations, the at least one processor of the advertisement marketplace system may provide access to the inventory of advertisement placement opportunities to advertisers without specification of any asking price by the mediacast content provider for any slot in the respective advertising placement opportunity. In some implementations, the at least one processor of the advertisement marketplace system may provide access to the inventory of advertisement placement opportunities to advertisers without revealing of a total number of slots available in the respective advertising placement opportunity to any of the advertisers.

At 406, the at least one processor of the advertisement marketplace system may receive, via the RTB adapter, requests for advertisement placement opportunities from one or more advertisers without exposing information specific to the request for advertisement placement opportunities to other advertisers. Each request may be a request for at least one undisclosed slot in one of the advertisement placement opportunities. For example, an advertisement placement opportunity may be for a specific channel, on a specific day, and during a specified 30 minute time window. A buyer may place a bid for the advertisement placement opportunity which purchases a slot (e.g., a 30 second slot) within the specified 30 minute time window.

The at least one processor of the advertisement marketplace system may receive the requests for advertisement placement opportunities from one or more advertisers without exposing information specific to the request for advertisement placement opportunities to mediacast content providers other than a respective mediacast content provider that provides the respective mediacast that includes the respective requested advertisement placement opportunity. In some instances, the at least one processor of the advertisement marketplace system may provide a mediacast content provider-facing user interface that receives requests for advertisement placement opportunities from one or more advertisers without exposing information that identifies a price offered for the respective advertisement placement opportunity to any other ones of the advertisers.

Figure 5:
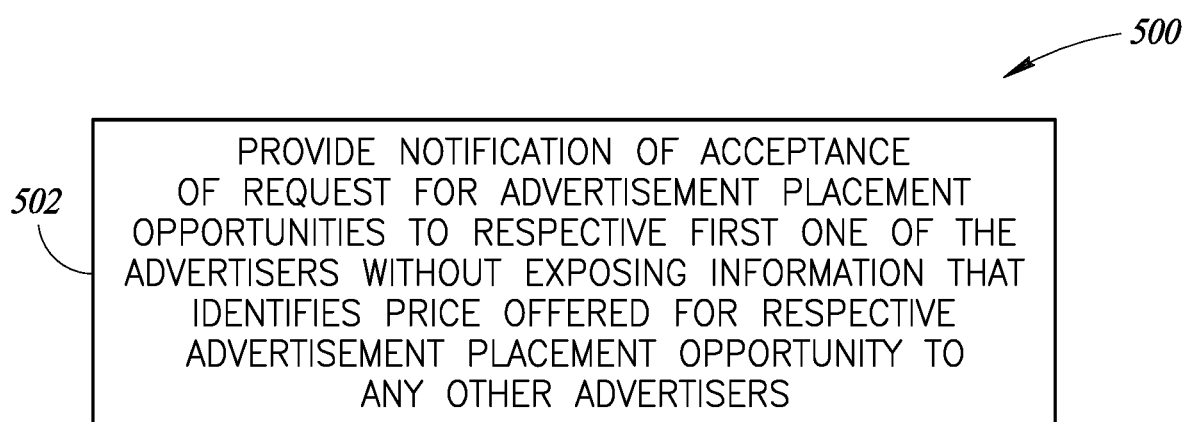
FIG. 5 shows a method of operating an advertisement marketplace computer system, according to one illustrated implementation, which may be employed in performing the method of FIG. 4.

FIG. 5 shows a method 500 of operating an advertisement marketplace computer system, according to one illustrated implementation. The method 500 may be employed in performing the method 400 (FIG. 4).

At 502, the at least one processor of the advertisement marketplace computer system provides notification of an acceptance of a request for advertisement placement opportunities to a respective first one of the advertiser without exposing information that identifies a price offered for the respective advertisement placement opportunity to any other ones of the advertisers.

FIG. 6 shows a method 600 of operating an advertisement marketplace computer system, according to one illustrated implementation. The method 600 may be employed in performing the method 400 (FIG. 4).

At 602, the at least one processor of the advertisement marketplace computer system implementing a budget capping that prevents acceptance of requests from the advertiser once an advertiser specified budget for a defined campaign is exceeded by acceptance by the mediacast content providers of other requests by the advertiser for the defined campaign.

FIG. 7 shows a method 700 of operating an advertisement marketplace computer system, according to one illustrated implementation. The method 700 may be employed in performing the method 400 (FIG. 4).

At 702, the at least one processor of the advertisement marketplace computer system implements a smoothing that prevents acceptance of requests from the advertiser once an advertiser specified maximum concentration for a defined campaign is exceeded by acceptance by the mediacast content providers of other requests by the advertiser for the defined campaign.

FIG. 8 shows a method 800 of operating an advertisement marketplace computer system, according to one illustrated implementation. The method 800 may be employed in performing the method 400 (FIG. 4).

At 802, the at least one processor of the advertisement marketplace computer system implements a daily close of all advertisement placement opportunities pertaining to a given mediacast day, requests for advertisement placement opportunities pertaining to the given mediacast day, and acceptances of requests for advertisement placement opportunities pertaining to the given mediacast day.

Figure 9:
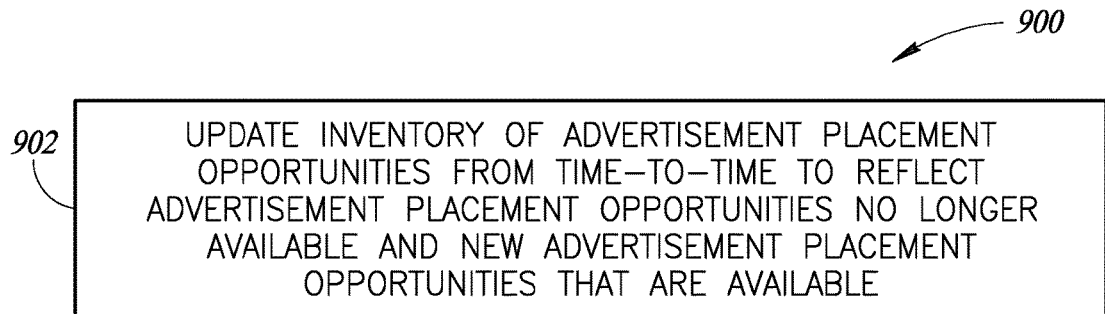
FIG. 9 shows a method of operating an advertisement marketplace computer system, according to one illustrated implementation, which may be employed in performing the method of FIG. 4.

FIG. 9 shows a method 900 of operating an advertisement marketplace computer system, according to one illustrated implementation. The method 900 may be employed in performing the method 400 (FIG. 4).

At 902, the at least one processor of the advertisement marketplace computer system updates the inventory of advertisement placement opportunities from time-to-time to reflect advertisement placement opportunities no longer available and new advertisement placement opportunities that are available.

Figure 10:
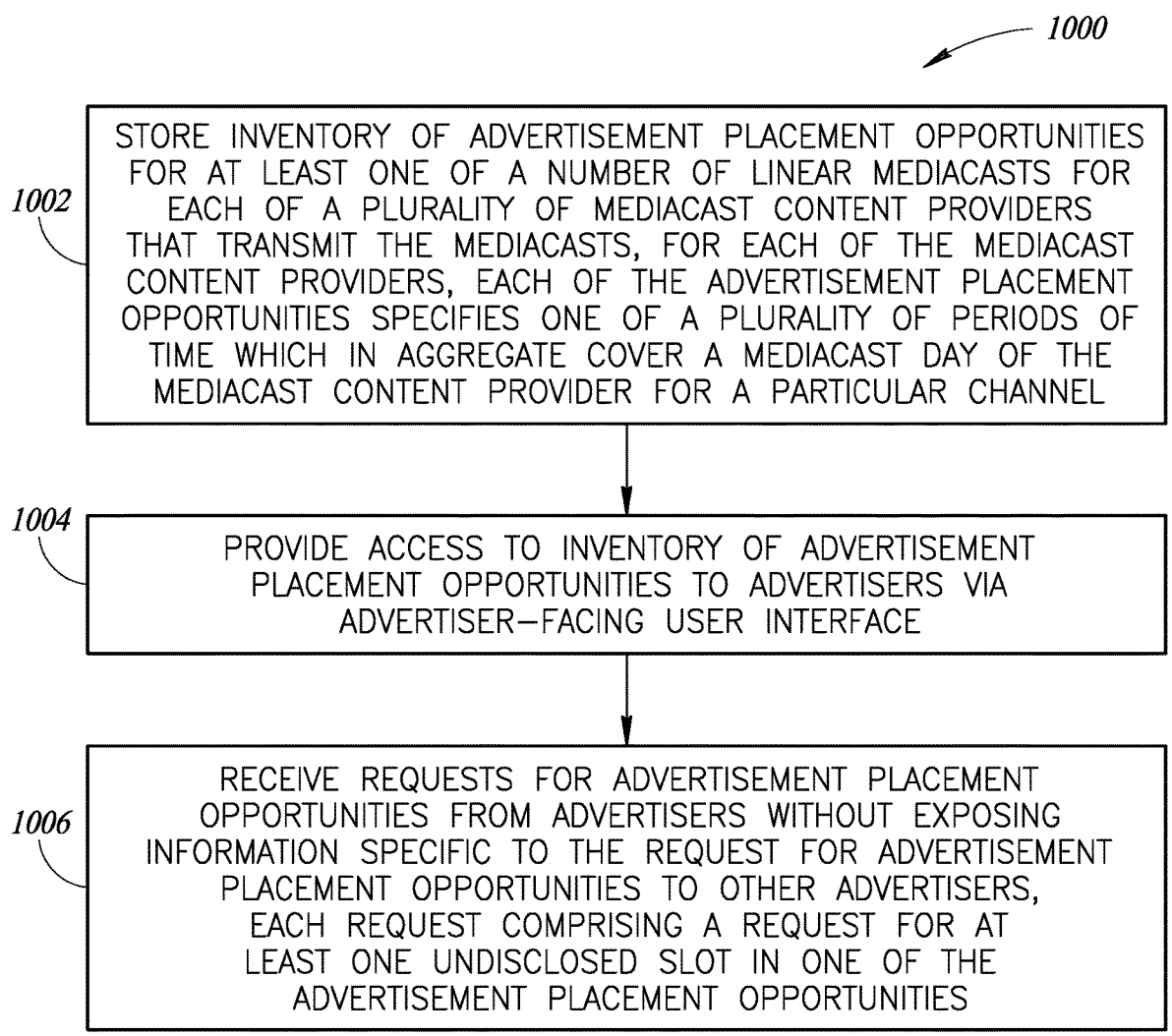
FIG. 10 shows a method of operating an advertisement marketplace computer system to automate placement of advertisements in linear mediacasts, according to one illustrated implementation.

FIG. 10 shows a method 1000 of operating an advertisement marketplace computer system to automate advertisement placement in linear mediacasts (e.g., broadcasts, Webcasts). At 1002, at least one processor of the advertisement marketplace system may store in at least one nontransitory processor-readable storage medium an inventory of advertisement placement opportunities to place advertisements in at least one of a number of linear mediacasts for each of a plurality of mediacast content providers that transmit the mediacasts via mediacast channels. For each mediacast channel of each of the mediacast content providers, each of the advertisement placement opportunities may specify one of a plurality of periods of time which in aggregate cover a mediacast day of the mediacast channel. Each of the advertisement placement opportunities may include a plurality of slots in the respective period of time of the advertisement placement opportunity. In some instances, at least some of the plurality of slots have a duration shorter than the specified period of time of the respective advertising placement opportunity.

At 1002, the at least one processor of the advertisement marketplace system may provide access to the inventory of advertisement placement opportunities to advertisers via an RTB adapter.

At 1004, the at least one processor of the advertisement marketplace system may receive, via the RTB adapter, requests for advertisement placement opportunities from one or more advertisers without exposing information specific to the request for advertisement placement opportunities to other advertisers. Each request may include a request for at least one undisclosed slot in one of the advertisement placement opportunities.

Figure 11:
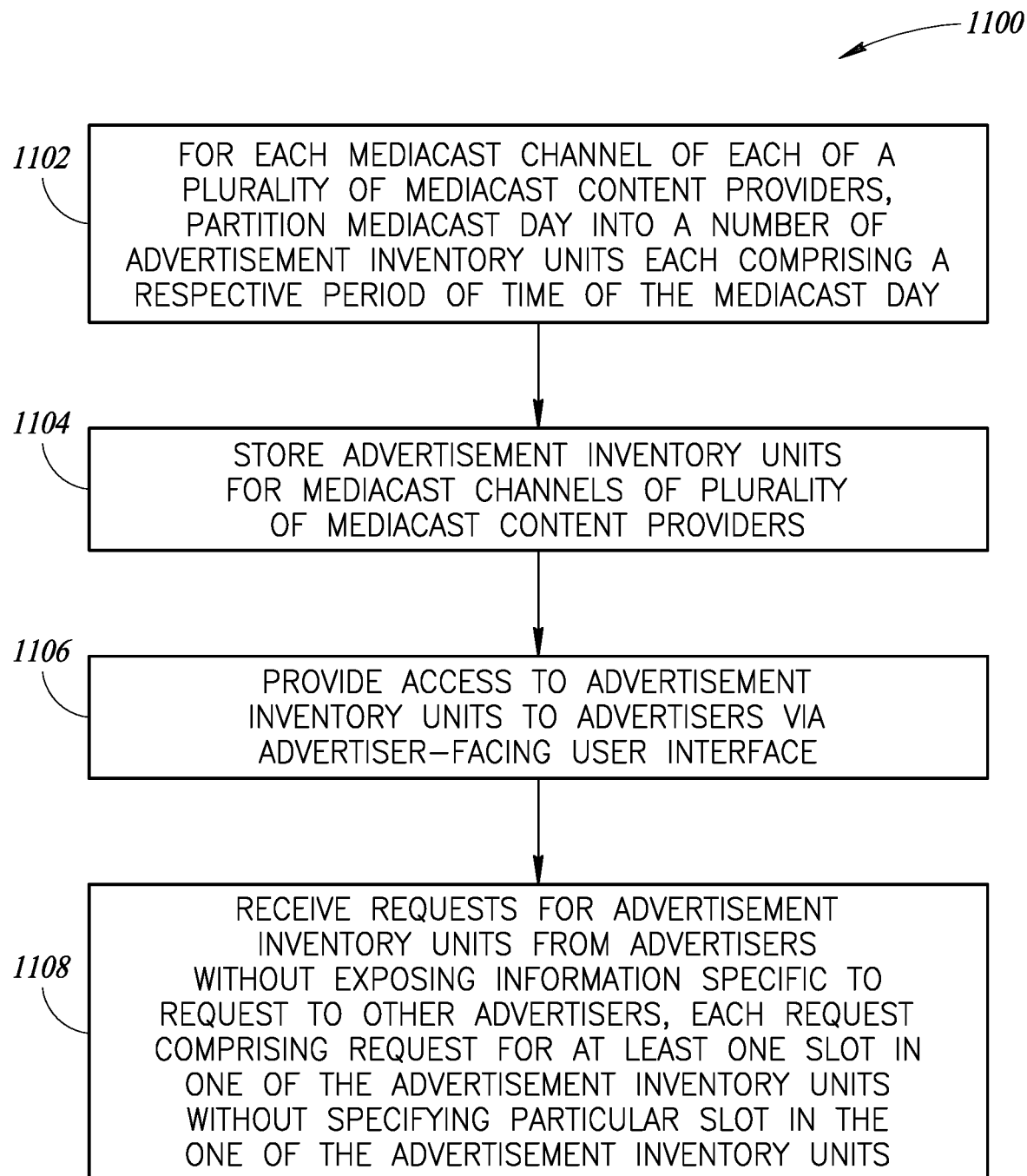
FIG. 11 shows a method of operating an advertisement marketplace computer system to automate placement of advertisements in linear mediacasts, according to one illustrated implementation.

FIG. 11 shows a method 1100 of operating an advertisement marketplace computer system to automate advertisement placement in linear mediacasts (e.g., broadcasts, Webcasts). At 1102, at least one processor of the advertisement marketplace system may, for each mediacast channel of each mediacast content provider, partition a mediacast day into a number of advertisement inventory units. Each of the number of advertisement inventory units may correspond to a respective period of time of the mediacast day and may include a plurality of advertisement slots.

At 1104, the at least one processor of the advertisement marketplace system may store in at least one nontransitory processor-readable storage medium the advertisement inventory units for each of the mediacast channels of the plurality of mediacast content providers.

At 1106, the at least one processor of the advertisement marketplace system may provide access to the advertisement inventory units to advertisers via an RTB adapter.

At 1108, the at least one processor of the advertisement marketplace system may receive, via the RTB adapter, requests for advertisement inventory units from one or more advertisers without exposing information specific to the request to other advertisers. Each request may include a request for at least one slot in one of the advertisement inventory units without specifying a particular slot in the one of the advertisement inventory units.

Figure 12:
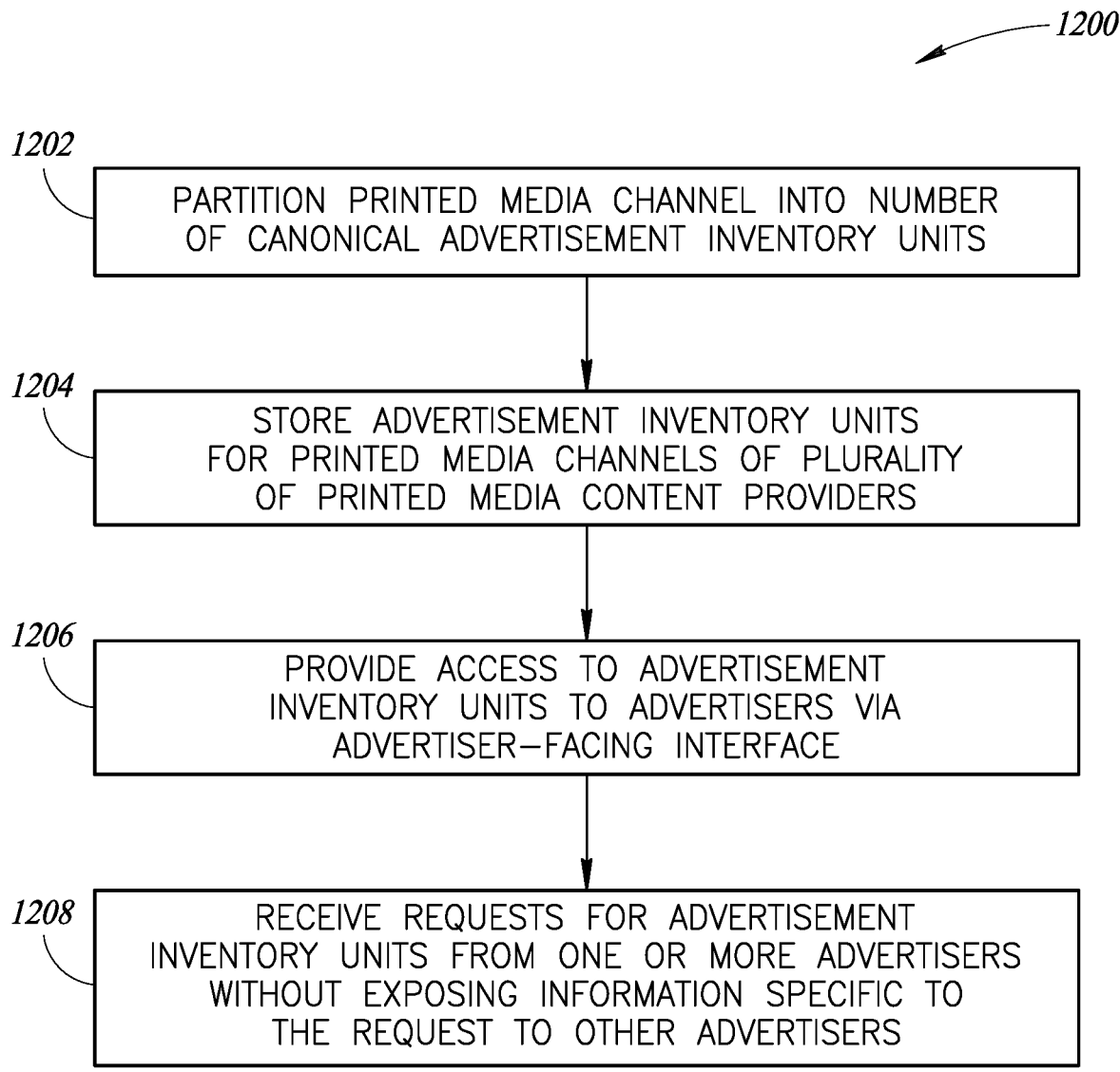
FIG. 12 shows a method of operating an advertisement marketplace computer system to automate placement of advertisements in printed media channels, according to one illustrated implementation.

FIG. 12 shows a method 1200 of operating an advertisement marketplace computer system to automate advertisement placement in printed media (e.g., newspapers, magazines, books, signs). The method 1200 may be executed in conjunction with and by the same advertisement marketplace system which performs any of the methods discussed above.

At 1202, at least one processor of the advertisement marketplace system may, for each printed media channel of each printed media content provider, partition the printed media channel into a number of canonical advertisement inventory units. Each of the number of advertisement inventory units may be defined by a respective portion of the printed media channel and may include a plurality of advertisement slots. For instance, in the case of a magazine, each canonical inventory unit may define a particular section (e.g., table of contents, feature stories, letters to the editor) of the magazine and a particular publication date, and each inventory unit may include multiple advertisement slots.

At 1204, the at least one processor of the advertisement marketplace system may store in at least one nontransitory processor-readable storage medium the advertisement inventory units for each of the printed media channels of the plurality of printed media content providers.

At 1206, the at least one processor of the advertisement marketplace system may provide access to the advertisement inventory units to advertisers via an RTB adapter.

At 1208, the at least one processor of the advertisement marketplace system may receive, via the RTB adapter, requests for advertisement inventory units from one or more advertisers without exposing information specific to the request to other advertisers. Each request may include a request for at least one slot in one of the advertisement inventory units without specifying a particular slot in the one of the advertisement inventory units.

As discussed above, the advertisement marketplace or exchange system 100 (FIG. 1) includes a seller console or SSP 108 which allows sellers to preview creative, view and accept offers, create orders, and send orders to a traffic management system for publishing (e.g., broadcast). Before the seller console is utilized for recurring activities, sellers may complete a setup process which includes enabling channels and billing groups in the traffic management system and creating a programmatic agency in the traffic management system.

The setup process may also include configuring channels in the seller console so that the channels are available for buyers to target when creating campaigns. In some implementations, the seller may configure a new channel by indicating the following marketplace fields for a channel: name, affiliation, Nielsen call letters, video definition, media type and sign on. The name of the channel is how the channel will be displayed on all screens viewable by buyers and sellers. The affiliation is the broadcasting network with which the channel is affiliated. Such association may be used by buyers to target channels with specific affiliates. The video definition is the media definition which the channel supports (e.g., high definition, standard definition). The media type is the type of media which airs on the channel, such as broadcast TV, cable network, radio, satellite, etc. The "sign on" field is the time of the mediacast day. In some implementations, the sign on field defaults to 12:00 AM but should be updated to match the sign on time of the channel in the traffic management system.

The seller may also setup various fields which relate to the traffic management system. As an example, such fields may include: Central Property, Electronic Contract (EC) name, Send Orders, Traffic Channel, and Use Single Inventory Code. The EC Name is the name that matches the EC Name on the channel in the traffic management system. The EC name may be stamped on each line of the order in the traffic management system. Regarding the Send Orders field, when an offer is accepted, the seller can either send the order to the traffic management system manually, automatically send the order immediately, or automatically send the order right after the daily marketplace close. The Traffic Channel field specifies the channel in the traffic management system. The Material Group field identifies the material group in the traffic management system that the seller wants to use for this channel. Regarding the Use Single Inventory Code field or checkbox, if a single inventory code is being used in the traffic management system for all orders received from the marketplace, this box may be checked or otherwise selected so that inventory code mapping only has to be created once. Such allows orders to be automatically imported.

The seller console may also allow the seller to select the priority codes which are eligible to be preempted by programmatic spots. For example, if a spot in a time block is already filled in the traffic management system, an accept rule may only accept a programmatic spot if the spot in the traffic management system has a selected priority code which indicates the spot is preemptible.

During setup of the seller console, the seller may also configure the revenue method the seller wants the system to utilize when showing the seller uplift (e.g., how much higher a programmatic offer is compared to spots booked through other sales channels) on a color-coded calendar-based heat map (see FIGS. 17-18). Such revenue methods may include average, maximum, average preemptible, maximum preemptible, and lowest, for example. For the lowest, average, and highest revenue methods, the acceptance rules and the calendar area are based on the lowest, average, and highest rates, respectively, of all placed spots in each half hour block in the traffic management system. For the average preemptible revenue method and the highest preemptible method, the acceptance rules and the calendar area are based on the average and highest rate, respectively, of only the preemptible spots in each half hour block in the traffic management system. Preemptible spots may be determined based on the selected priority codes, as discussed above.

Once the seller has setup the seller console, the seller console may be used for recurring activities.

FIG. 13 shows a new direct response avail window 1300 which allows a seller to define a new direct response avail time. Generally, if there are specific times on a channel's log where direct response (DR) inventory can be placed and the seller wants to receive bids for DR inventory, the seller may define times and days via the new direct response avail window 1300 in the seller console.

The new direct response avail window 1300 may include three tabs: a description tab 1302, a pricing tab 1304, and a reserve rule tab 1306. Fields under the description tab 1302 are shown in FIG. 13. In the description tab 1302, the seller may select a name 1308, program notes 1310, channel 1312, start time 1314, end time 1316, days 1318, and acceptable unit lengths 1320.

Under the pricing tab 1304, the seller may define a date range for the rule and the percentage higher ("increase") the DR offer must be to be accepted over already booked inventory. The seller may also define the minimum acceptable rate ("floor"), the maximum spots which will be accepted for the week for the rule ("Max Units per Order"), and whether the seller wants to have a set floor ("ask") price or increase the floor ("ask") based on the lowest placed rate.

Under the reserve rule tab 1306, the seller may set the number of offers which are held for the avail and may choose whether the seller wants to increase the floor if the number of held offers is exceeded.

Once the new DR avail has been setup, buyers may then request avails and the times defined by the seller are returned to the buyers. Buyers may then submit offers for the defined DR avail times. The offers may be held in a "holding tank" which may be used to fill open capacity. For example, the offers may be ranked by rate and selected in a manner which maximizes revenue for the seller.

FIG. 14 shows a new accept rule window 1400 which includes a description tab 1402 and a rule items tab 1404. To avoid having to manually accept offers, the seller may create auto-acceptance rules which execute every evening on marketplace close (e.g., 4:00 PM) and may autonomously accept offers which match the rule parameters. Using auto-acceptance rules may be optional, which allows sellers to manually accept all offers if desired.

To setup a new auto-acceptance rule, the seller may select the description tab 1402 in the new accept rule window 1402. The seller may then enter a description, channel, start time, end time, days, and the minimum amount that will be accepted for the rule (floor).

On the rule items tab 1404, the seller may set a start time 1406, end time 1408, eligible days 1410, the number of 30-second spots to sell (EU30s to sell) 1412, whether to allow non-approved creative 1414, and acceptable spot lengths 1416. Regarding the number of EU30s to sell, the rule will stop executing after this number has been met.

The auto-acceptance rules may be simple rules or may include complex rules or groups of rules. For example, an auto-acceptance rule may specify that an offer is to be accepted if the offer is from a particular advertiser (or group of advertisers) and the offer is one of the top three offers received, or if the offer is within a certain percentage of the highest offer received, or if the offer is within a certain dollar amount of the highest offer received, etc.

The seller may also setup auto-rejection rules. Auto-rejection rules may be used to automatically reject offers from specific advertisers (e.g., advertisers which have made offers via another sales channel). Once the auto-rejection rule is set, sellers will not see offers from the chosen advertiser(s) or offers that are rejected using one or more auto-rejection rules. Using auto-rejection rules is optional. That is, seller may simply manually reject offers or just ignore offers which they do not want to accept.

The auto-acceptance and auto-rejection rules may be set based on a hierarchical permissions scheme. For example, a finance lead of a seller may set a price floor so that offers below the price floor are not seen by sales personnel. Generally, such a permissions scheme may be used by the seller to control the amount of decision making authority that is given to various personnel.

The activities which may be completed on a daily or recurring basis include: pre-approving creative, reviewing and accepting offers, sending orders to the traffic management system, importing and processing orders in the traffic management system, monitoring activity in the marketplace, and invoicing and collecting. Each of these activities is discussed below with reference to FIGS. 15-22.

FIG. 15 shows a creative area window 1500. When an offer is submitted, creative is submitted with the offer and displays in the creative area window 1500. The media types for the creatives may be any suitable media types. For example, for TV, media types may include MPEG, ProRes, Avid, etc.

If the seller is using auto-acceptance rules to accept offers, the seller should pre-approve creative before the marketplace closes for the day. If the seller is manually accepting offers, the seller may choose whether to pre-approve creative or not. Creative may also be approved during manual offer acceptance.

To pre-approve a creative, the user may select an approvals tab 1502 in the creative area window 1500. The user may then select a review icon 1504 next to a particular creative, which causes a review creative window to display. The user may then review the creative and watch a preview of the creative. The user may then approve or reject the creative.

Once the seller's channels have been enabled and configured, buyers will begin submitting offers for those channels. Offers may be reviewed and accepted or rejected in several different ways, including: reviewing offers from a dashboard window 1600 shown in FIG. 16, reviewing and accepting offers from a calendar area window 1700 shown in FIGS. 17 and 18, reviewing and accepting offers from a rotations area window 1900 shown in FIG. 19, automatically accepting offers using rules, or automatically reject offers using rules.

As shown in FIG. 16, the dashboard area window 1600 displays a list 1601 of channels which have offers for the upcoming week. The user may select a calendar icon 1602 next to a channel to view the offers which have been submitted for that channel in a calendar view of the next week, broken into half hour blocks in the calendar area window 1700 (FIGS. 17 and 18). The user may also select a rotations icon 1604 next to a channel to view the offers which have been submitted for that channel in a list format, grouped into rotations in the rotations area window 1900 (FIG. 19).

FIGS. 17 and 18 show the calendar area window 1700. The calendar area window 1700 allows the user to view the offers which have been submitted for a selected channel 1702 and week 1704 in a color-coded calendar-based heat map 1706.

In some implementations, there are multiple demand lenses which may be used to view the offers in different ways. Such lenses may be selected by a demand lens view icon 1708. As an example, demand lenses may include uplift amount, offer rate, DR avails, offer count, and open capacity. The uplift amount view displays darker shades of color (e.g., green) for higher uplift amounts. Uplift is the amount that a submitted offer is higher than spots sold through another sales channel (e.g., through the traffic management system). The offered rate view displays darker shades of color for higher offers. The DR avails view shows defined DR time blocks with the number of offers, offer amounts and uplift for each block. The offer count view shows darker shades of color for half hour blocks with a higher number of submitted offers. The open capacity view shows darker shades of color for half hour blocks that have more slots that are open or preemptible slots in the traffic management system.

Once the user selects a channel, week and demand lens view, the user may select a campaign 1710 displayed on the left side of the calendar area window 1700. For each half hour block ("inventory unit"), the heat map 1706 displays the number of open and preemptible equivalent 30-second spots on the traffic management system log, the offer amount equivalized to 30 seconds, and the uplift, which is the difference between the offer amount and the average, maximum, or lowest rate for spots booked in the traffic management system.

The colors on the heat map 1706 may indicate the amount of deviation from the average based on the selected demand lens. For example, lower than average may be represented by light green, average may be represented by a medium green, and higher than average may be represented by a dark green.

To accept an offer, the user may select a channel, week, and campaign. The user may then click on or select a single block, or the user may drag across the days and times for which the seller wants to accept offers. As shown by an elliptical-shaped annotation 1712 in FIG. 18, an area selected by the user may turn a different color (e.g., teal) to indicate that multiple blocks have been selected.

When multiple blocks are selected as shown in FIG. 18, the user may select an accept rotation icon 1714 which causes an accept rotation window to be displayed. The accept rotation window may allow the user to configure the rotation start time, days, and number of spots to sell in the rotation. As noted above, in some implementations, all bids in a rotator are set to the lowest bid rate in a particular grouping.

The user may also select a creative icon 1716 to review and approve the creative before accepting the rotation. In some implementations, creatives may be approved by group. For example, creatives relating to a particular topic (e.g., alcoholic beverages, politics) may be accepted for a first group of channels (e.g., sports channels, movie channels) but rejected for a second group of channels (e.g., religious channels, children's programming channels).

The user may also select a credit icon 1718 to review and approve the credit of the advertiser before accepting the rotation. As an example, FIG. 23 shows a review credit window 2300 which provides details for an advertiser or agency (e.g., Advertiser A) including credit limit 2302, credit available 2304, status information 2306, days outstanding 2308, advertiser categories 2310, an agency of record form icon 2312 which provides access to an agency of record form, and a credit application icon 2314 which provides access to the advertiser's credit application. The status information 2303 may include credit information about an advertiser or agency relating to other sellers. For example, the status information 2303 may include credit approval information for the advertiser from other sellers and may indicate whether the advertiser is making payments to other sellers on time. Such features allow sellers to view how much good or bad credit an advertiser has across the entire marketplace.

FIG. 19 shows the rotations area window 1900 which displays a list 1902 of the offers submitted by buyers for the selected channel and day. Offers may be grouped into rotations by channel, agency, advertiser and adjacent half hour blocks.

To accept an offer from the rotations area window 1900, the user may select the rotations icon 1604 (FIG. 16) from the dashboard area window 1600 to cause the rotations area window to be displayed. The user may then click on a manually accept offer icon 1904 next to a rotation to accept a rotation from the list 1902. Upon selecting the manually accept offer icon 1904, an accept rotation window may be displayed which allows the user to configure the rotation start time, days, and number of spots to sell for the rotation.

In addition to manually accepting offers, the user may also create automatic acceptance and rejection rules, as discussed above with regard to the setup of the seller console.

Figure 20:
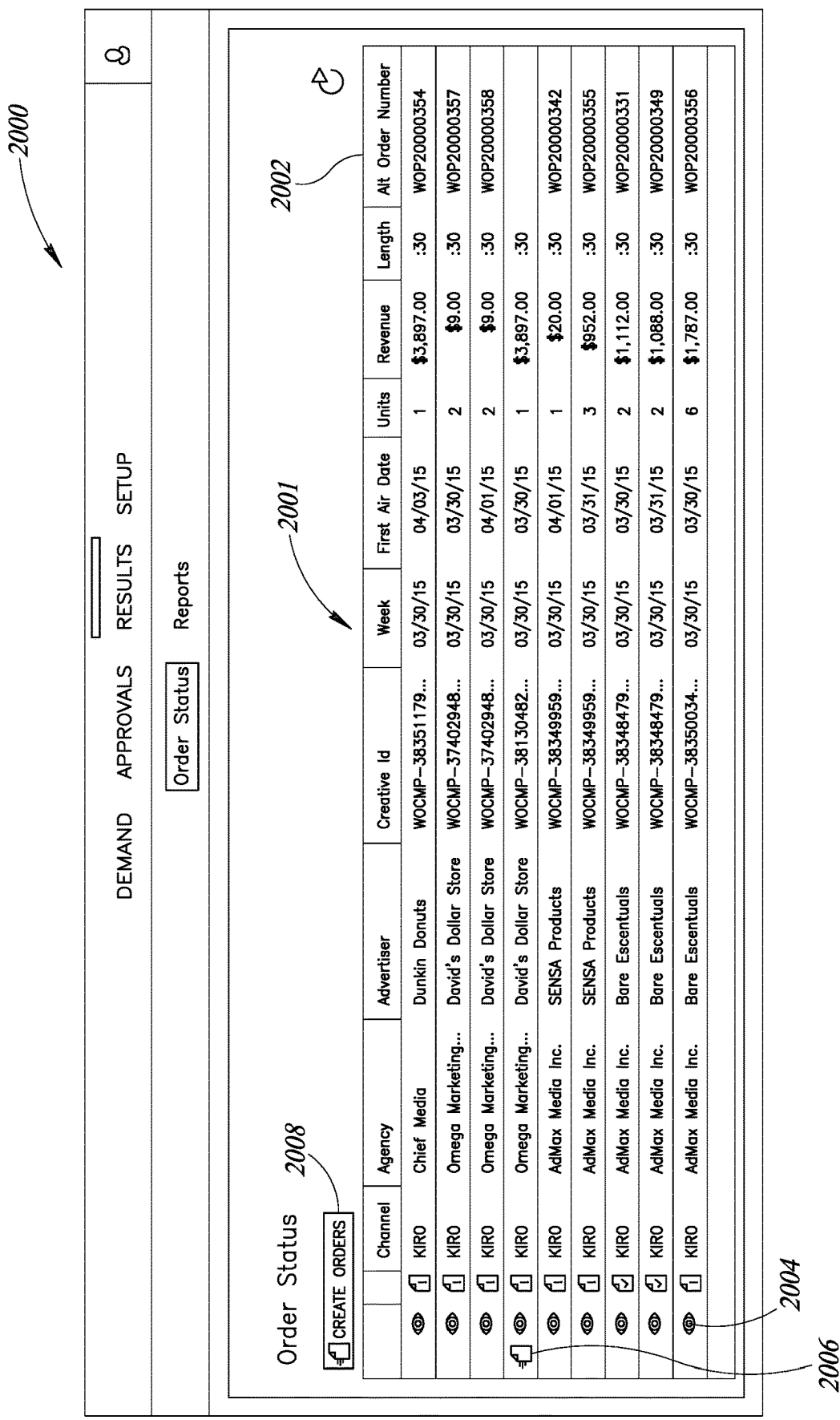
FIG. 20 is a screenshot of an order status area window of a seller console, according to one illustrated implementation.

FIG. 20 shows a screenshot of an order status area window 2000 of a results module of the seller console. When an order is manually accepted or the marketplace window closes and auto-accept rules execute, a list 2001 of orders are displayed in the order status area window 2000 of the results module. If an order has not yet been sent to the traffic management system, an Alt Order Number column 2002 is left blank. Before sending the order, the user may view the spots included by selecting a view icon 2004 next to an order. To send the order to the traffic management system, the user can select a create order icon 2006 next to an individual order or may select a create orders icon 2008 above the list 2001 to send all unsent orders to the traffic management system.

Once orders have been sent to the traffic management system, the orders are displayed in an electronic orders task where the orders can be imported into the traffic management system. Once an order is imported into the traffic management system, it may be approved and processed.

After the seller has started using the system to accept offers and to send orders to the traffic management system, and spots have begun publishing (e.g., airing), the user may want to monitor the activity. Such monitoring may be provided via the dashboard area window or the order status area window of the seller console.

Figure 21:
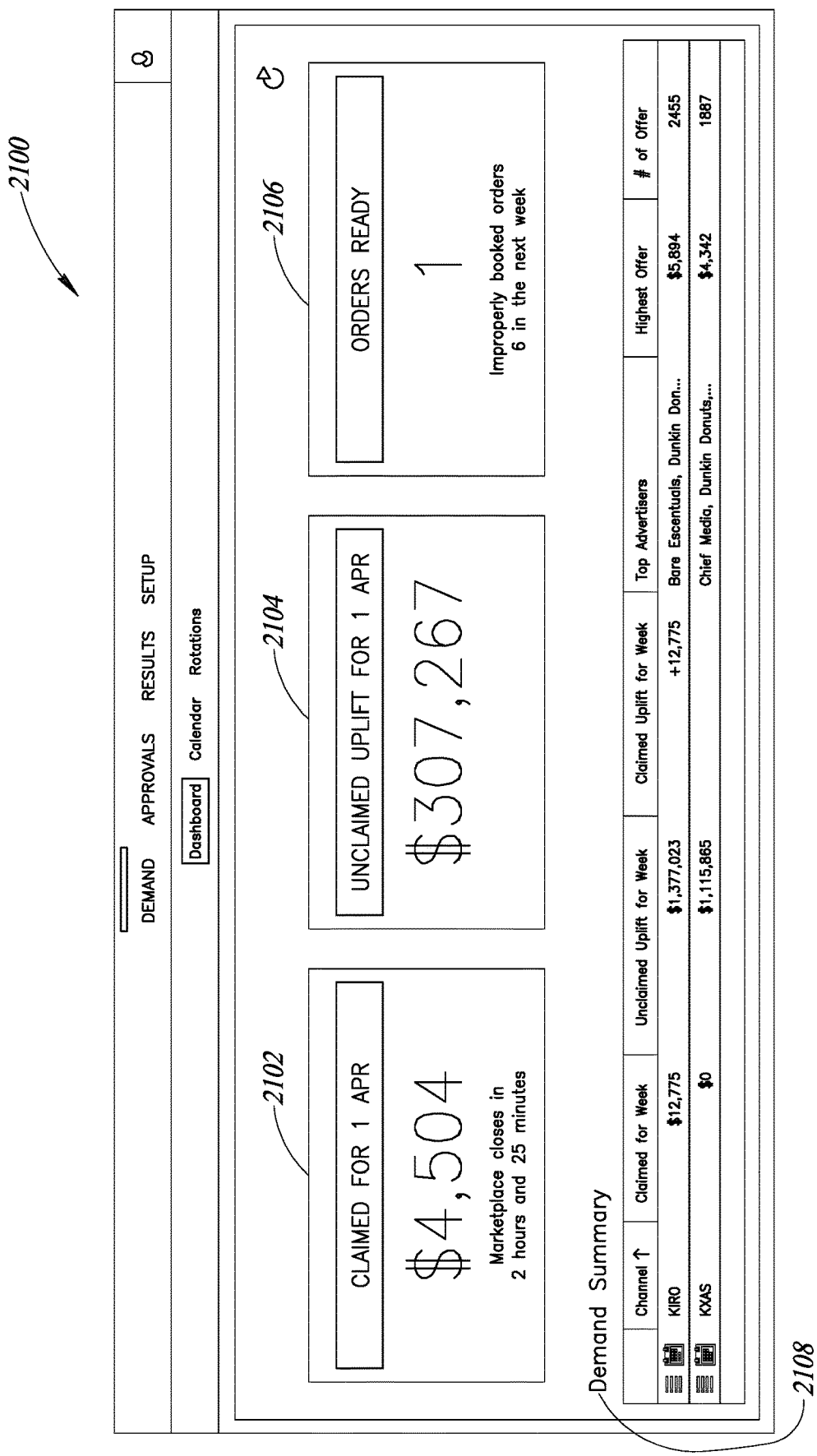
FIG. 21 is a screenshot of a dashboard area window of a seller console which shows claimed dollars, unclaimed dollars, and a number of orders ready to be sent to a traffic management system, according to one illustrated implementation.

FIG. 21 shows a dashboard area window 2100 which shows claimed (accepted) dollars 2102, unclaimed (submitted) dollars 2104, and the number of orders 2106 ready to be sent to the traffic management system. The dashboard area window 2100 also provides a demand summary section 2108 which allows the user to view an overview of the demand for each channel with offers for the upcoming week.

Figure 22:
FIG. 22 is a screenshot of an order status area window of a seller console which includes status icons next to each order, according to one illustrated implementation.

FIG. 22 shows an order status area window 2200 which includes status icons 2202 next to each order. A first status icon 2202 may indicate that all spots in the order are in one of the following states: not sent to the traffic management system, not placed in the traffic management system, or not placed in the correct half hour block in the traffic management system. A second status icon 2204 may indicate that some spots are placed in the correct half hour block in the traffic management system and some spots are either not placed in the traffic management system or are not placed in the correct half hour block. A third status icon 2206 may indicate that all spots in the order are placed in the correct half hour block in the traffic management system.

Sellers may generate an invoice for a "programmatic agency" in the traffic management system which causes the traffic management system to generate monthly invoices. The invoice line items may detail all purchased spots that were certified as aired within the mediacast month, for example.

Figure 24:
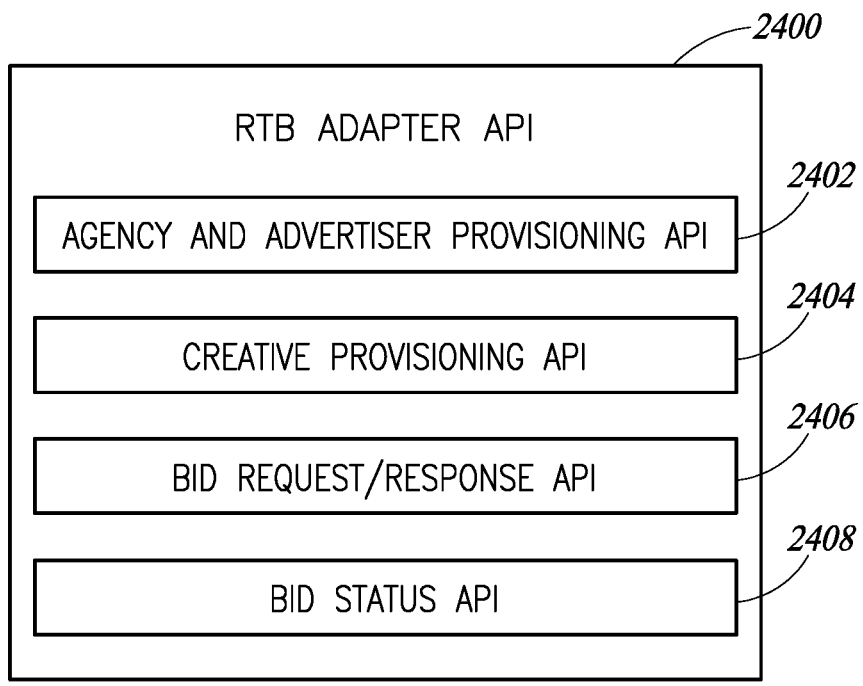
FIG. 24 shows a schematic block diagram of a real-time bidding (RTB) adapter API which may be used to implement an RTB adapter of FIG. 1, according to one illustrated implementation.

FIG. 24 shows a schematic block diagram of an RTB adapter API 2400 which may be used to implement the RTB adapter 103 (FIG. 1) to allow digital DSPs 110 to seamlessly interface with the advertisement marketplace system 102. The RTB adapter API 2400 includes an Agency and Advertiser Provisioning API 2402, a Creative Provisioning API 2404, a Bid Request/Response API 2406, and a Bid Status API 2408. Each of these APIs 2402-2408 is discussed in further detail below.

The Agency and Advertiser Provisioning API 2402 may be used to map advertiser and agency names in a DSP 110 (FIG. 1) to advertiser and agency names in the advertisement marketplace system 102 (FIG. 1). The Agency and Advertiser Provisioning API 2402 may include functionality which allows the DSP 110 to search for advertisers or agencies that exist in the advertisement marketplace system 102. If mappings have been created, the DSP 110 may pull a list of all of the agency or advertiser mappings that are stored by the advertisement marketplace system 102. The DSP 110 can also specify an agency or advertiser ID in the DSP 110 and have an ID of the advertisement marketplace system 102 mapped to the agency or advertiser returned.

Once the DSP 110 finds an agency or advertiser name in the advertisement marketplace system 102 that is a match to an agency or advertiser in the DSP, the DSP may send the mapping between the two to the marketplace system which stores the mapping.

Figure 25:
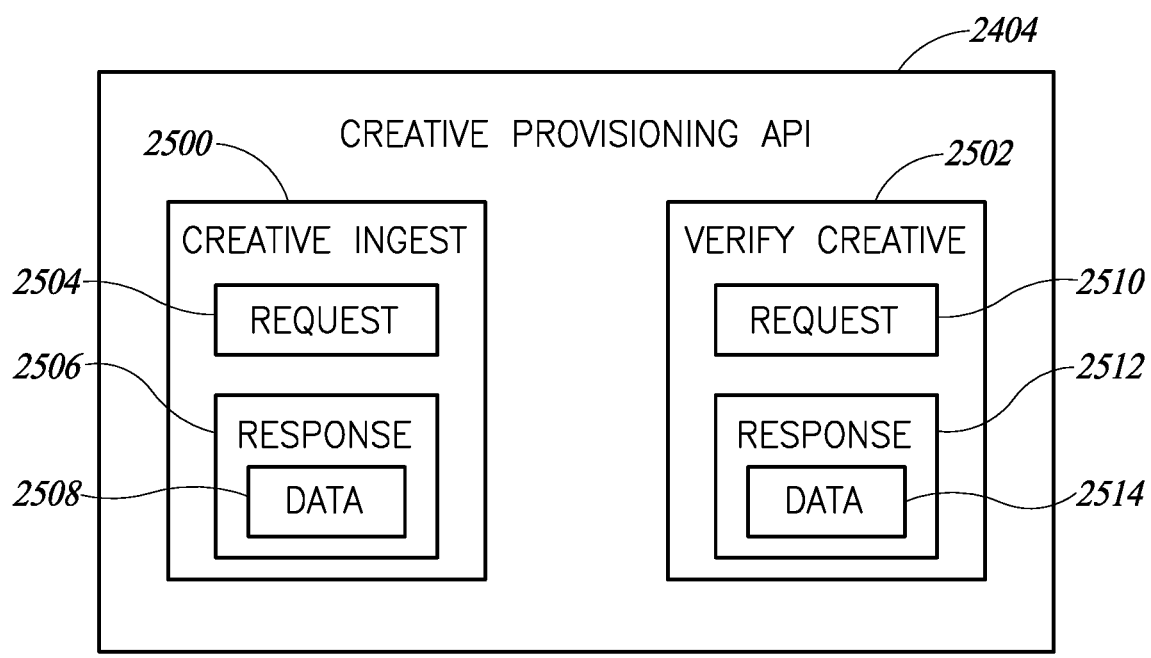
FIG. 25 shows a schematic diagram of a Creative Provisioning API of the RTB adapter of FIG. 24, according to one illustrated implementation.

FIG. 25 shows a schematic diagram of the Creative Provisioning API 2404 of FIG. 24. The Creative Provisioning API 2404 provides the API structure for preregistering creative for use in the advertisement marketplace system. The actions which may be performed with the Creative Provisioning API 2404 include ingesting creative to the advertisement marketplace system via a Creative Ingest API 2500 and verifying creative status via a Verify Creative API 2502.

The Creative Ingest API 2500 allows the DSP 110 to pre-provision creative in the advertisement marketplace system 102. After creative is submitted to the advertisement marketplace system 102, the marketplace system sends back a CreativeID which is used by the DSP when submitting bids. The Creative Ingest API 2500 includes a Request object 2504 and a Response object 2506.

The Request object 2504 may include the following parameters:
1. ExternalAdId: The Ad-ID or Industry Standardized Commercial Identifier (ISCI) for the creative.
2. AgencyId: The DSP's pre-registered agency identifier. The AgencyId may first be mapped to the marketplace system agency ID using the Agency and Advertiser Provisioning API 2402 (FIG. 24).
3. AdvertiserId: The DSP's pre-registered advertiser identifier. The AdvertiserId may first be mapped to the marketplace system advertiser ID using the Agency and Advertiser Provisioning API 2402 (FIG. 24).
4. RequestId: The request identifier for response validation on the client-side. The RequestID may be returned in the response.
5. Title: The creative title for easy identification.
6. VideoUrl: The location of the creative resource. The advertisement marketplace system downloads the creative from this URL.
7. Length: The length of the creative in milliseconds (e.g., 30000 for a 30-second spot).
8. MediaDefinition: Indicates whether the creative is high definition ("HD") or standard definition ("SD").
9. Mime: The creative mime-type (e.g., "video/mp4").
10. Bitrate: The bitrate of the creative.
11. Width: The width of the creative's Slate in pixels.
12. Height: The height of the creative's Slate in pixels.

The Response object 2506 may return the following fields if the request is successful:
1. Success: Indicates whether the API response is successful (true) or not (false).
2. Data object 2508: A collection of data about the creative.
3. Message: Additional text content as a message.
4. Code: The message code.

The Data object 2508 may include the following fields:
1. ResponseId: The value of RequestId attribute received in the request body.
2. CreativeId: The unique identifier for the creative in the advertisement marketplace system. The Creative ID should be used when sending bid responses.

The Verify Creative API 2502 allows the DSP to verify if a creative is still valid/available in the advertisement marketplace system. The Verify Creative API 2502 may include a Request object 2510 and a Response object 2512.

The Request object 2510 may include the following parameters:
1. RequestId: The request identifier for response validation on the client-side. The RequestID will be returned in response.
2. AgencyId: The DSP's pre-registered agency identifier. This ID may first be mapped to the advertisement marketplace system agency ID using the Agency and Advertiser Provisioning API 2402 (FIG. 24).
3. AdvertiserId: The DSP's pre-registered advertiser identifier. This ID may first be mapped to the advertisement marketplace system advertiser ID using the Agency and Advertiser Provisioning API 2402 (FIG. 24).
4. ExternalAdId: The Ad-ID or ISCI for this creative.
5. CreativeId: The unique identifier for the creative in the advertisement marketplace system that is being verified. The Response object 2512 of the Verify Creative API 2502 may return the following fields if the request is successful:
1. Success: Indicates whether the API response is successful (true) or not (false).
2. Data Object 2514: A collection of the creative data and status.
3. Message: Additional text content as message.
4. Code: The message code.

The Data Object 2514 of the Response object 2512 may contain the following fields:
1. ResponseID: The value of RequestId attribute received in the request body.
2. IsActive: Indicates whether the creative is still valid (true) or not (false).
3. CreativeID: The unique identifier for the creative in the advertisement marketplace system. This ID should be used when sending bid responses.
4. DetectedMediaDefinition: Detected definition of the creative: high definition ("HD") or ("SD"). A creative is detected as HD if the aspect ratio equals 16:9 and the height is greater than or equal to 720px. A creative is detected as SD if the aspect ratio is 4:3 or 16:9 and the height is greater than or equal to 480px but less than 720px.
5. DetectedSpotLength: The determined length in milliseconds of spot that this video file would appear in (e.g., 30000 for a 30-second spot).
6. Details object: The information about the creative and any warnings or errors.

The Details object of the Data object 2514 may include the following fields:
1. Type: The type of message: INFO, WARN, or ERROR.
2. Messages: The messages that apply to the message type.

Figure 26:
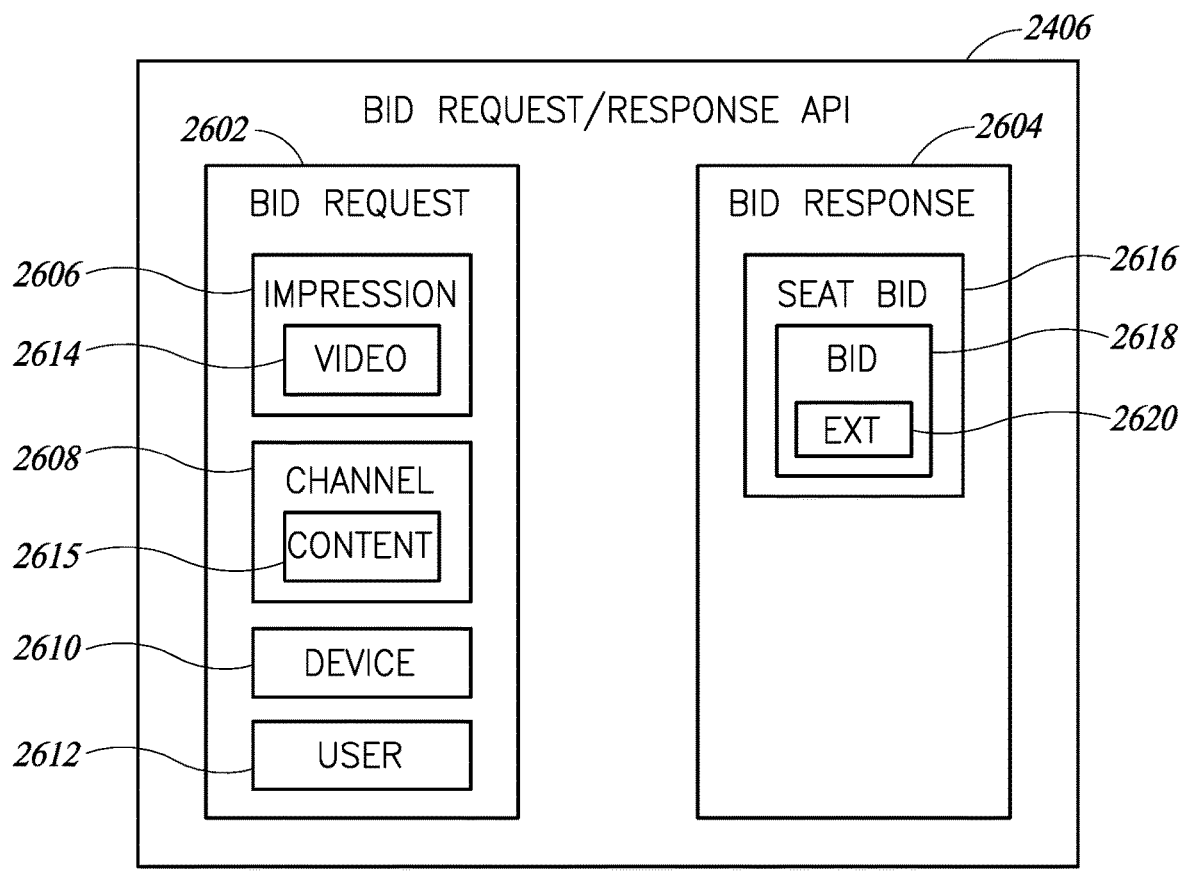
FIG. 26 shows a detailed diagram for a Bid Request/Response API of the RTB adapter shown in FIG. 24, according to one illustrated implementation.

FIG. 26 shows a detailed diagram for the Bid Request/Response API 2406 also shown in FIG. 24. The Bid Request/Response API 2406 uses OpenRTB to send bid requests and receive bid responses from DSPs. Every day at a determined time (e.g., 9:00 am PST), requests for bids (RFBs) are sent through OpenRTB to the DSPs for a day date range (e.g., 8 days) with the start of the date range being one week from that day, for example. Each RFB is for an inventory unit defined by a specific channel, day, and half hour. Upon receiving the RFB, the DSP immediately either provides a bid response with a bid amount or indicates that the DSP has no demand for the inventory unit.

The Bid Request/Response API 2406 includes a Bid Request object 2602 and a Bid Response object 2604. The Bid Request object 2602 may include the following fields which are sent in an RFB:

1. id: The bid request ID. The id should be returned in the bid response for tracking between systems.
2. at: The auction type (First price auction=1, Second price auction=2).
3. tmax: The maximum amount of time in milliseconds the DSP has to submit a bid response before the advertisement marketplace system will time out.
4. impression object 2606: An array of IUs. In some implementations, only one IU can be specified per bid request. At least one IU is required for a valid bid request.
5. channel object 2608: The channel object contains all of the information about the channel and the date/time of the inventory unit (IU).
6. device object 2610: The device object provides information pertaining to the device including its hardware, platform, location, and carrier. This object contains two fields: (1) ua: The browser user agent string. For the advertisement marketplace system, this may be "BroadCastTV"; (2) js: This field indicates whether the advertisement system provides support for JavaScript.
7. user object 2612: 3rd party data which may be tagged on.

The impression object 2606 may include the following fields and objects:
1. id: A unique identifier for this IU within the context of the bid request (typically, value starts with 1, and increments up to n for n impressions).
2. bidfloor: The minimum price in CPM that will be accepted for the bid.
3. video object 2614: The "video" object provides dimensions, durations, and other details about the allowed creative.

The video object 2614 may contain the following fields:
1. mimes: The MIME types that are supported ("video/avi", "video/mpg", "application/mxf", "video/mov", "video/mp4").
2. api: A list of supported API frameworks (VPAID 1.0=1, VPAID 2.0=2).
3. battr: Blocked creative attributes such as pop-ups or expandable. The advertisement marketplace system blocks all creative attributes.
4. boxingallowed: Indicates whether letter boxing is allowed. In some implementations, this field should always be 0.
5. delivery: The supported delivery options (Streaming=1, Progression=2).
6. h: The height of the creative in pixels. If the station supports HD creative, the height is sent as 1080; if the station only supports SD creative, the height is sent as 576.
7. linearity: Indicates whether the creative is linear or overlay. This may be 1 (Linear/In-stream) for the advertisement marketplace system.
8. maxbitrate: The maximum bitrate in Kbps for the creative.
9. maxduration: The maximum available time slot for the creative in seconds. This may be 30 for the advertisement marketplace system, for example. It is noted that the creative file that is submitted with the bid response can be longer than the specified duration but the playable content (video minus slate and black space) should match the duration specified in the bid request.
10. minbitrate: The minimum bit rate in Kbps for the creative.
11. minduration: The minimum available time slot for the creative in seconds. This may be 30 for the advertisement marketplace system, for example. It is noted that the creative file that is submitted with the bid response can be longer than the specified duration but the playable content (video minus slate and black space) should match the duration specified in the bid request.

12. playbackmethod: Playback method (Auto-play sound on=1).
13. pos: The ad position. This field only applies to internet advertising and will always be 0 for the advertisement marketplace system bid requests.
14. protocol: Creative protocols used by the advertisement marketplace system (VAST2=2).
15. sequence: If multiple ad impressions are offered in the same bid request, the sequence number will allow for the coordinated delivery of multiple creatives.
16. startdelay: Indicates the start delay in seconds for preroll, midrool, or postroll ad placement (preroll=0, midroll=−1, postroll=−2).
17. w: The width of the creative in pixels. If the station supports HD creative, the width is sent as 1920; if the station only supports SD creative, the width is sent as 768.

The Channel object 2608 may contain the following fields and objects:
1. callletters: The channel call letters.
2. name: The channel name.
3. content object 2615: The "content" object provides details about the inventory unit (IU) in the RFB.

The Content object 2615 contains the following fields:
1. airtime: The broadcast start time of the 30-minute inventory unit (IU). It is noted that values will go beyond 23:59 for overnights. Broadcast sign-on time varies by station. For example, if a station broadcast day starts at 0500, then the range of airtime will be 0500-2830, where 2830 means 4:30 am of the next calendar day, but same broadcast day, which is also referred to as 4:30xm.
2. airdate: The broadcast day of the 30-minute IU.
3. keyword: Optional keywords for the slot.
4. series: The program that is airing during the 30-minute IU.
5. title: The title of the program or episode airing during the 30-minute IU.

If the DSP has demand for the inventory unit sent in the bid request, the DSP substantially immediately (e.g., within 10 seconds, within 1 second, within 100 milliseconds) sends a bid response with the bid amount and the advertiser, agency, and creative. The Bid Response API includes the following fields:
1. id: The bid request ID. This should be the ID from the bid request for tracking between systems.
2. seatbid object 2616: In some implementations, at least one seatbid object is required in a bid response object.

The seatbid object 2616 contains a "bid" object 2618 which is an array of bid objects. Each bid object relates to an impression object 2606 in the bid request.

The bid object 2618 includes the following fields:
1. id: The ID for the "bid" object chosen by the bidder for tracking and debugging purposes. The ID is used to reference the bid in the Bid Status API, discussed below.
2. impid: The impression ID. This should match the "id" field in the impression object 2606 of the RFB.
3. price: The bid amount in CPM. Although this value may be a float, OpenRTB suggests using integer math for accounting to avoid rounding errors.
4. advertiserid: The DSP's pre-registered advertiser identifier. This ID may first be mapped to the advertisement marketplace system advertiser ID using the Agency and Advertiser Provisioning API 2402 (FIG. 24).
5. agencyid: The DSP's pre-registered agency identifier. This ID may first be mapped to the advertisement marketplace system agency ID using the Agency and Advertiser Provisioning API 2402 (FIG. 24).
6. nurl: The callback URL for win/hold/loss notifications.
7. adm: The creative as escaped XML/VAST. See the VAST Response Fields (Inline Creative Assignment) and VAST Response Fields (Pre-provisioned Creative) sections below for the fields inside the "adm" field.
8. ext object 2620: The "ext" object 2620 contains information about the bid group and campaign budgeting.

The ext object contains the following fields:
1. bidgroup: The bid group ID. This is used to group together bids so that the DSP can control budget and spot wins across inventory units.
2. bmax: The budget cap across all bids in the bid group.
3. smax: The spot wins cap across all bids in the bid group.
4. timestamp: A sequencing value that is used to ensure the bid group constraints have the most recently submitted value. This may be an actual time or a sequence value. It allows the bidder to edit "smax" and "bmax" values over the course of bidding. For a given marketplace day, the system may honor the "bmax" and "smax" with the last timestamp.

Figure 27:
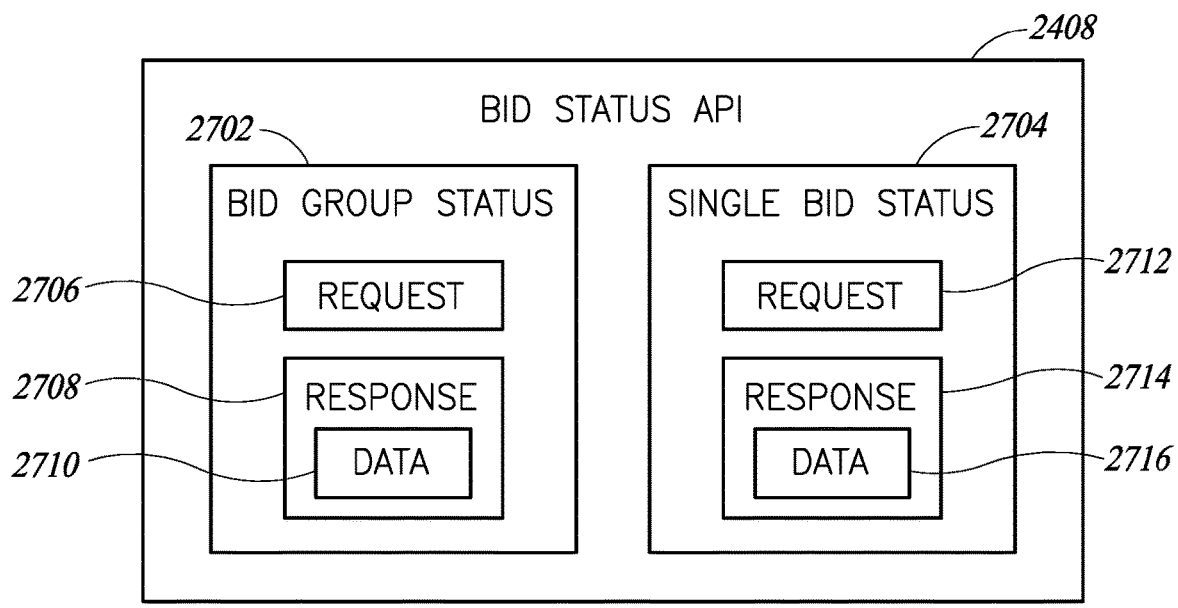
FIG. 27 shows a detailed view of a Bid Status API of the RTB adapter shown in FIG. 24, according to one illustrated implementation.

FIG. 27 shows a detailed view of the Bid Status API 2408 also shown in FIG. 24. The Bid Status API 2408 may be used to obtain the status of a bid group via a Bid Group Status API 2702 or to obtain the status of a single bid via a Single Bid Status API 2704.

Using a Request object 2706 of the Bid Group Status API 2702, the DSP 110 can get the status of a bid group that has been submitted by specifying a bid group ID. The following fields may be returned via a Response object 2708 of the Bid Group Status API 2702:
1. Data object 2710: The bid group status data.
2. Success: A value indicating whether the API response is successful or not.
3. Code: The error code if the response was unsuccessful.
4. Message: The error message if the response was unsuccessful.

The following fields may be contained in the data object 2710:
1. Id: The unique bid group identifier.
2. MaxSpots: The maximum bids/spots on a bid group submitted to the advertisement marketplace system.
3. MaxSpend: The maximum spend budget on a bid group submitted to the advertisement marketplace system.
4. BidIds: The bid IDs associated with the bid group.

Using a Request object 2712 of the Single Bid Status API 2704, the DSP 110 can get the status of a bid that has been submitted by specifying a bid ID. The following fields may be returned via a Response object 2714 of the Single Bid Status API 2704:
1. Data object 2716: The bid status data.
2. Success: A value indicating whether the API response is successful or not.
3. Code: The error code if the response was unsuccessful.
4. Message: The error message if the response was unsuccessful.

The following fields and objects may be contained in the Data object 2716:
1. Id: The unique identifier for the bid.
2. BidGroupId: The unique identifier for the bid group.
3. CreativeId: The unique identifier for the creative associated with the bid.
4. Rate: The bid rate. It is noted that if the Status of the bid is Hold, discussed below, the Rate is set to the lowest rate in the rotator and may be lower than the submitted bid amount.
5. Status: The bid status (discussed below).
6. StatusString: The bid status as a string
7. AirDate: The bid air date.
8. AirTime: The bid air time.
9. AirtimeStatus: The bid air time status, discussed further below.
10. AirtimeStatusString: The bid airtime status as a string.

The "Status" field can have one of the following values:
1. None: No status available.
2. Submitted: The bid was successfully submitted to the advertisement marketplace system.
3. Win: The bid has been individually accepted in the advertisement marketplace system.
4. Loss: The bid has been manually or automatically rejected in the advertisement marketplace system. It is noted that all bids that are not accepted by the marketplace close at the end of the day are automatically rejected.
5. Hold: The bid has been accepted as part of a rotation in the advertisement marketplace system.
6. Failure: There are many reasons why a bid would be in this status, such as the marketplace was closed and submission failed.

The "AirtimeStatus" field can have one of the following values:
1. None: No status available.
2. Aired: The creative associated with the bid was aired. It is noted that a spot will not be reported as aired until the station's log is reconciled, which usually happens one day after air, or not until Monday for Friday spots.
3. NotAired: The creative associated with the bid was not aired.

Figure 28:
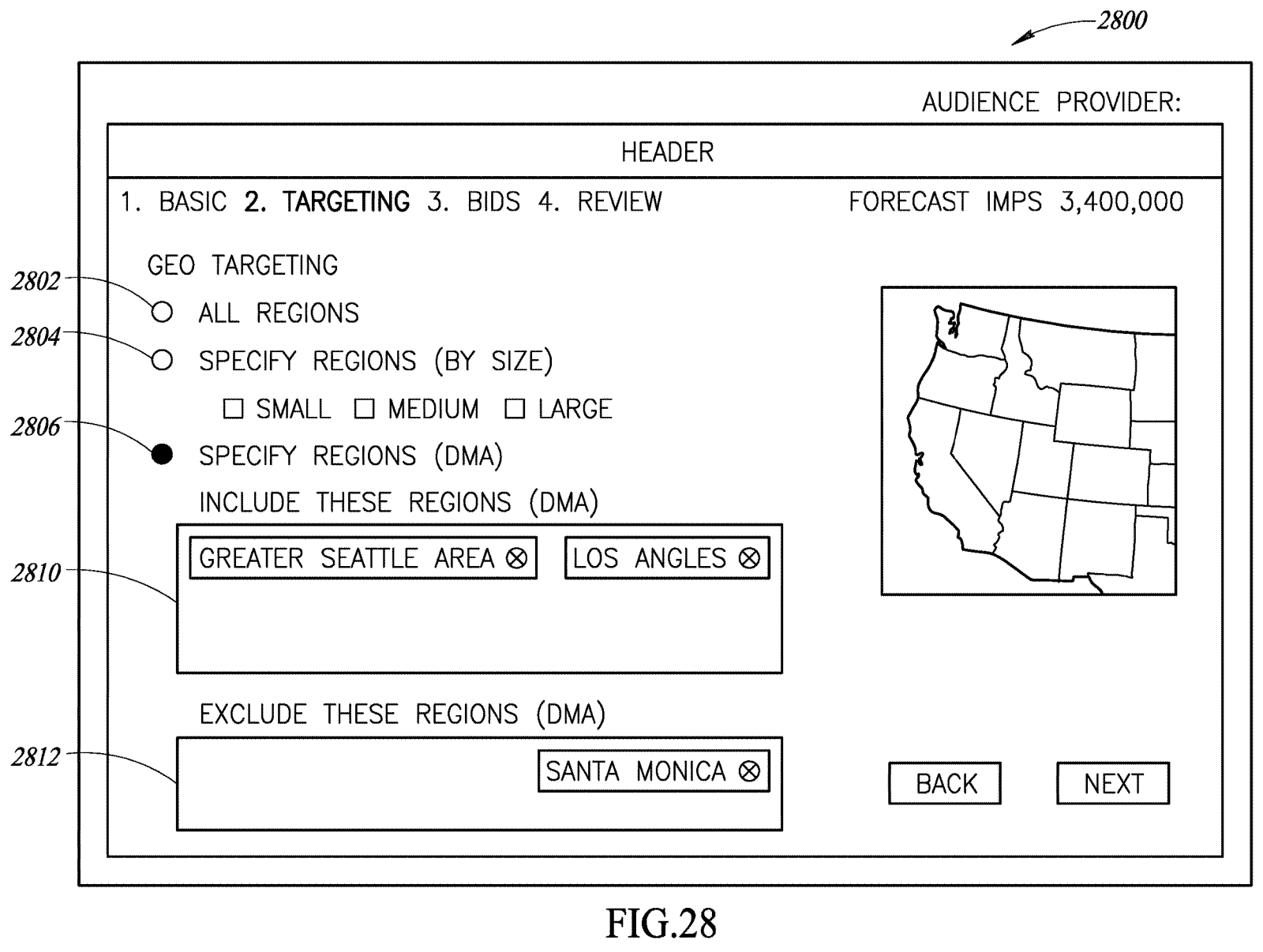

FIG. 28 shows a screenshot 2800 of a graphical user interface which allows a buyer to target bids for a campaign based on geographic location. The buyer may select all regions 2802, specified regions by size 2804 (e.g., small, medium, large), or specified regions by Designated Market Area (DMA) 2806. If the buyer decides to specify regions by DMA, the user may add any number of regions to include in an include box 2810 and may add any number of regions to exclude in an exclude box 2812. For example, a buyer may include the greater Los Angeles market but may exclude the Santa Monica market.

Figure 29:
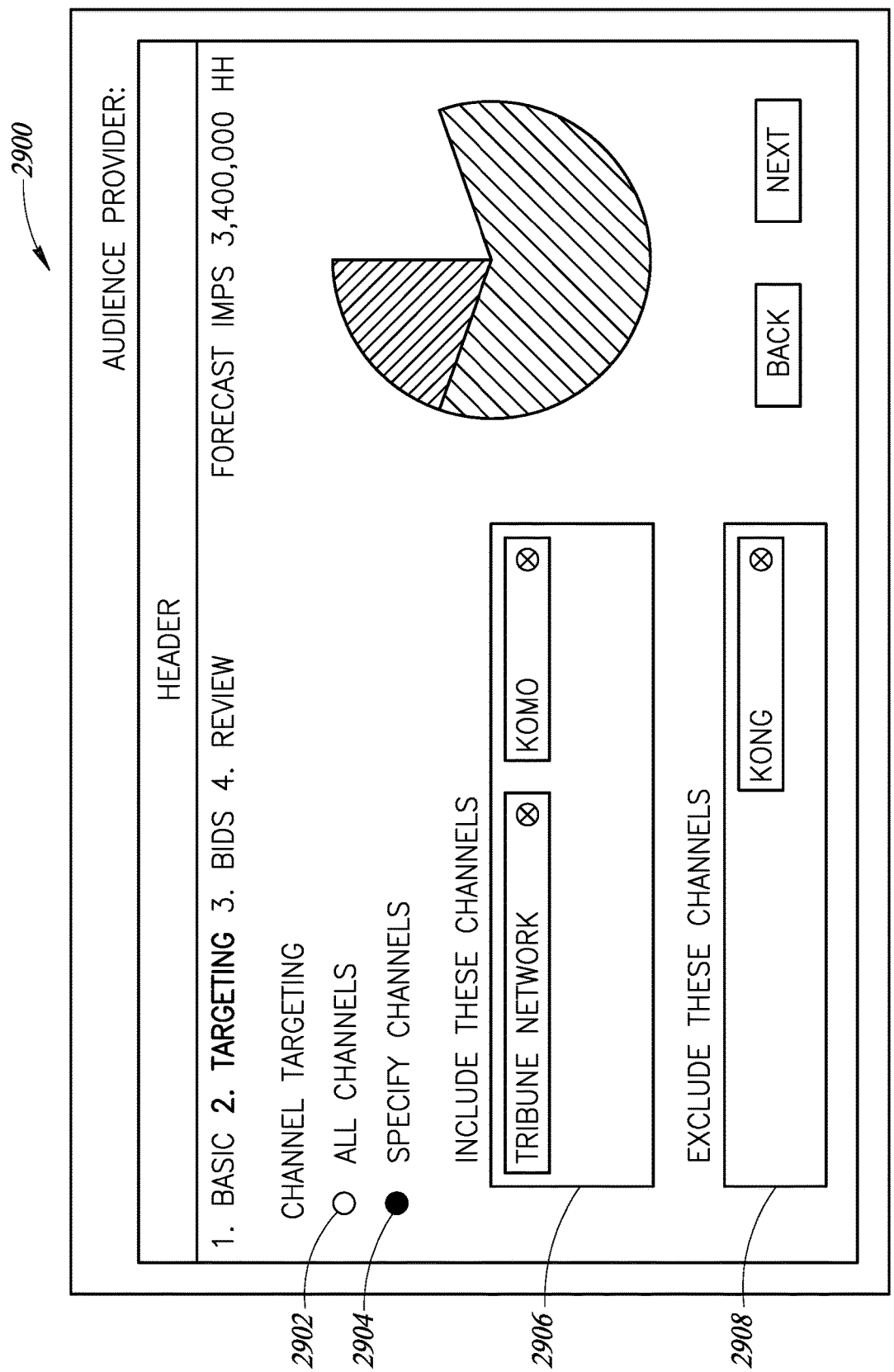
FIG. 29 shows a screenshot of a graphical user interface which allows a buyer to target bids for a campaign based on channel, according to one illustrated implementation.

FIG. 29 shows a screenshot 2900 of a graphical user interface which allows a buyer to target bids for a campaign based on channel. The buyer may select an "all channels" button 2902 to include all channels in the campaign or may select a "specify channels" button 2904 to specify channels to be included and excluded in the campaign. The graphical user interface may have a channel include box 2906 in which the buyer may specify channels to include, and a channel exclude box 2908 in which the buyer may specify channels to exclude.

Figure 30:
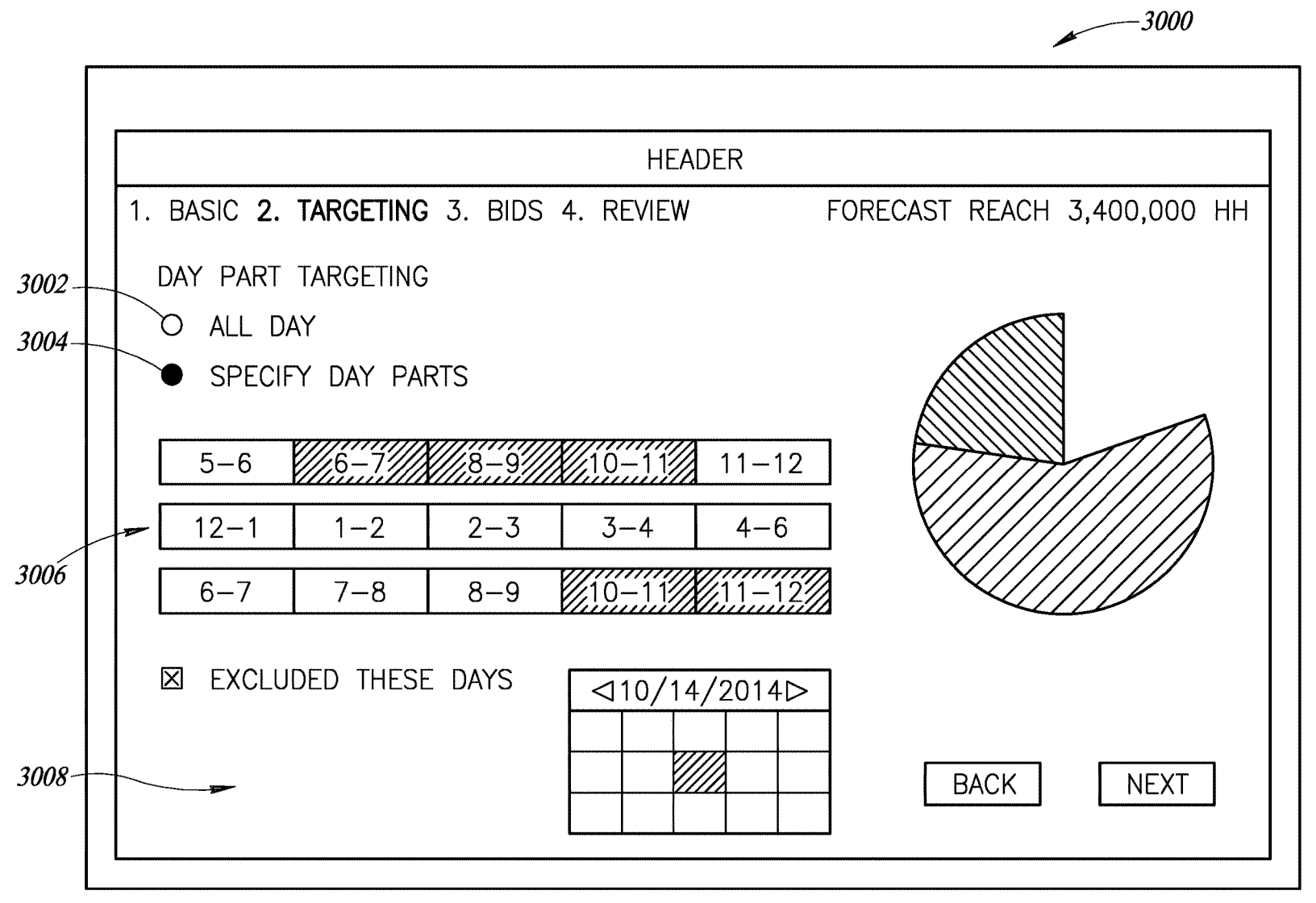

FIG. 30 shows a screenshot 3000 of a graphical user interface which allows a buyer to target bids for a campaign based on day parts. The buyer may select an "all day" button 3002 to select all parts of days, or may select a "specify day parts" button 3004 to specify day parts for the campaign. A day parts selection portion 3006 may allow the user to select one or more day parts to be included for the campaign. The graphical user interface may also include an "excluded day" portion 3008 which allows the buyer to select days to exclude from the campaign.

Figure 31:
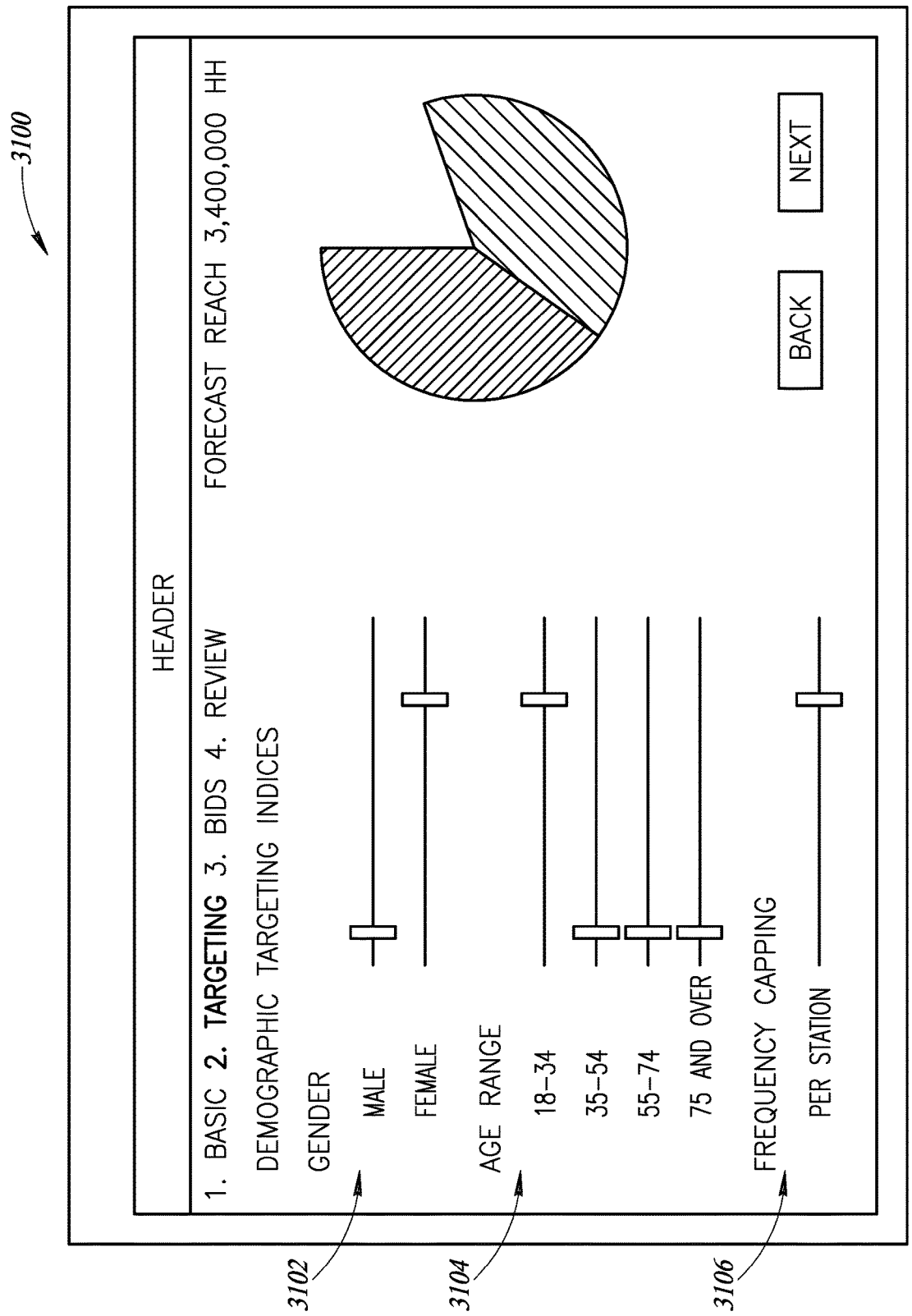
FIG. 31 shows a screenshot of a graphical user interface which allows a buyer to target bids for a campaign based on demographics, according to one illustrated implementation.

FIG. 31 shows a screenshot 3100 of a graphical user interface which allows a buyer to target bids for a campaign based on demographics. Specifically, in the example provided, the graphical user interface allows the buyer to target bids based on gender 3102, age range 3104, and frequency capping 3106 (e.g., per station). In some implementations, the graphical user interface may provide targeting based on a greater or lesser number of demographics.

Figure 32:
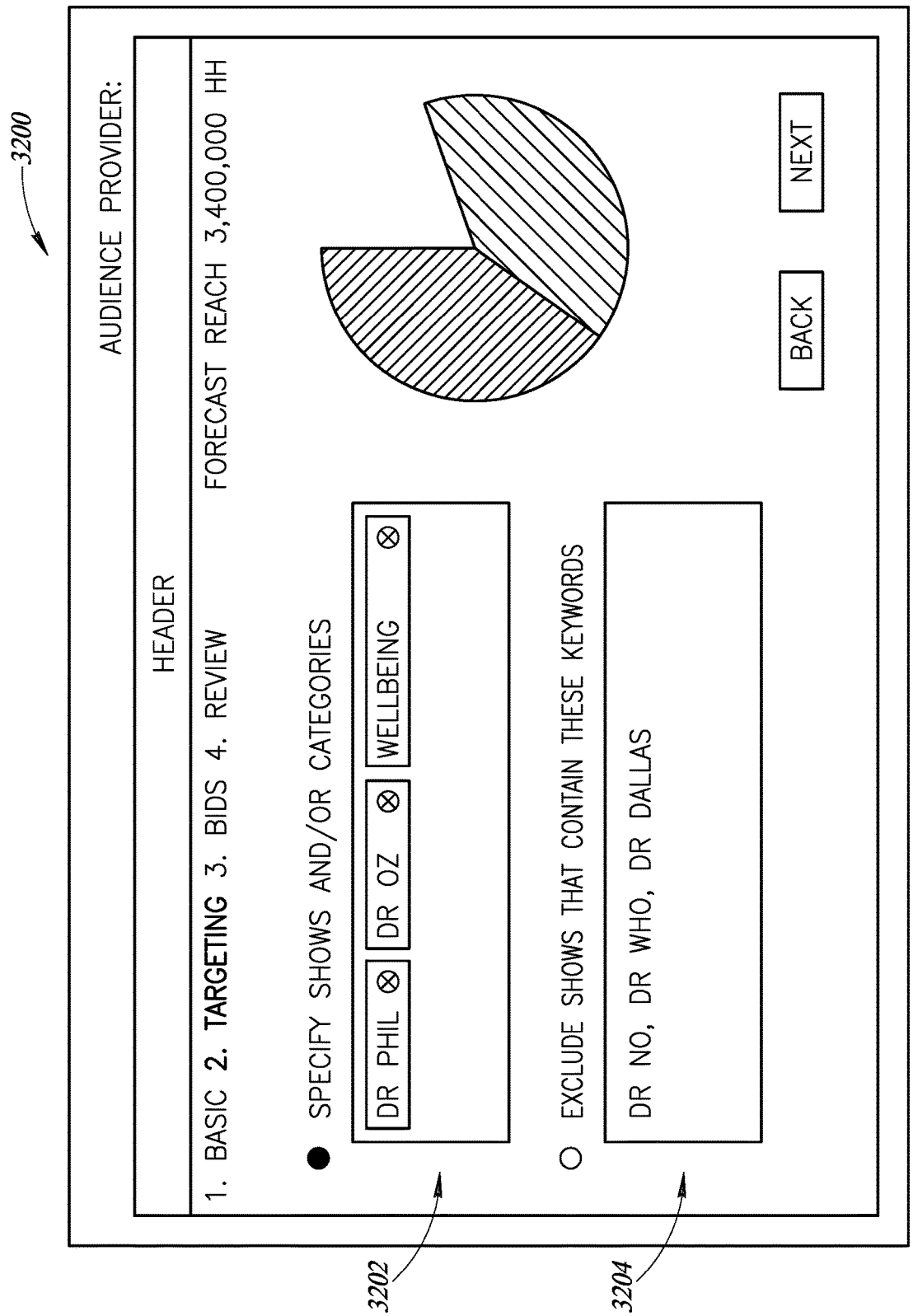
FIG. 32 shows a screenshot of a graphical user interface which allows a buyer to target bids for a campaign based on shows and/or categories, according to one illustrated implementation.

FIG. 32 shows a screenshot 3200 of a graphical user interface which allows a buyer to target bids for a campaign based on shows and/or categories of shows. The buyer may select a "specify shows and/or categories" button 3202 to select which shows or categories to include in the campaign. The buyer may also select an "exclude shows that contain these keywords" button 3204 to select shows to exclude in the campaign based on one or more keywords (e.g., football, children's programming).

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other systems, not necessarily the exemplary system generally described above.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs) or programmable gate arrays. However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as portable disks and memory, hard disk drives, CD/DVD ROMs, digital tape, computer memory, and other non-transitory processor-readable storage media.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet, including but not limited to U.S. Provisional Application Ser. No. 61/561,186 filed Nov. 17, 2011, U.S. patent application Ser. No. 11/958,143, published as Publication No. 2008-0120638, U.S. patent application Ser. No. 13/679,828 filed Nov. 16, 2012; U.S. patent application Ser. No. 13/744,136 filed Jan. 17, 2013; U.S. patent application Ser. No. 13/711,984 filed Dec. 12, 2012; U.S. patent application Ser. No. 13/956,020 filed July 31, 2013; U.S. patent application Ser. No. 14/485,416 filed Sep. 12, 2014; U.S. patent application Ser. No. 14/679,755 filed Apr. 6, 2015, U.S. Provisional Application Ser. No. 62/172,693 filed Jun. 8, 2015, U.S. Provisional Application Ser. No. 62/236,350 filed Oct. 2, 2015, U.S. Provisional Application Ser. No. 62/250,170 filed Nov. 3, 2015, and U.S. Provisional Application Ser. No. 62/250,165 filed Nov. 3, 2015, are incorporated herein by reference, in their entirety. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to automate advertisement placement in linear mediacasts, the system comprising:
at least one non-transitory processor-readable storage medium that stores an inventory of advertisement placement opportunities to place advertisements in at least one of a number of linear mediacasts for each of a plurality of mediacast content providers that transmit the mediacasts to a plurality of media consumers, each of the advertisement placement opportunities represented in a canonical form that specifies at least a respective period of time of the advertisement placement opportunity during a mediacast day of the mediacast content provider, wherein the mediacast day includes a plurality of canonical inventory units that each includes at least two non-sequential time slots for advertisement placement opportunities that share a unique channel, market, and period of time; and
at least one processor communicatively coupled to the at least one non-transitory processor-readable storage medium and which implements a real-time bidding interface that:
sends requests for the real-time bids for each of the plurality of canonical inventory units of the advertisement placement opportunities to real-time bidding systems associated with the advertisers via at least one data communication channel,
responsive to sending the requests, receives the real-time bids for the advertisement placement opportunities associated with the plurality of canonical inventory units from one or more real-time bidding systems associated with the advertisers via the at least one data communication channel, wherein each real-time bid is for a particular canonical inventory unit without selecting a particular time slot from the at least two non-sequential time slots in that particular canonical inventory unit, and
responsive to receiving the real-time bids for the advertisement placement opportunities, generates and causes presentation of a color-coded heat map reflecting the real-time bids through at least a variance in at least shades of color that represent at least an uplift amount indicating a price difference between (a) a submitted offer corresponding to at least one of the real-time bids and (b) one or more advertisement spots sold through another sales channel, portioned in accordance with the plurality of canonical inventory units, wherein a darker shade of color corresponds to a higher uplift amount, wherein the submitted offer corresponding to the at least one of the real-time bids has a higher price or equal price to the one or more advertisement spots sold through another sales channel;
wherein, for each of the mediacast content provider, the at least one processor implements the real-time bidding interface to send the requests for the real-time bids for each of the advertisement placement opportunities for periods of time which span an entire mediacast period of time for the mediacast content provider;
wherein the mediacast period of time for the mediacast content provider includes a plurality of consecutive mediacast days beginning on a day which is after the day on which the requests for the real-time bids are sent to the advertisers.

2. The system of claim 1 wherein each of the advertisement placement opportunities includes a plurality of slots in the respective period of time of the advertisement placement opportunity.

3. The system of claim 1 wherein the mediacast period of time for the mediacast content provider includes seven consecutive mediacast days beginning on the day which is one week after the day on which the requests for the real-time bids are sent to the advertisers.

4. The system of claim 1 wherein the at least one processor implements the real-time bidding interface to send the requests for the real-time bids which are formatted to comply with a standard protocol utilized by the advertisers for the real-time bidding on the advertisement placement opportunities.

5. The system of claim 1 wherein the at least one processor implements the real-time bidding interface to receive creative information formatted to comply with a standard protocol utilized by the advertisers for serving video advertisements over a communications channel.

6. The system of claim 1 wherein the at least one processor implements the real-time bidding interface to send notifications to the advertisers indicating that a purchased advertisement spot has aired.

7. The system of claim 6 wherein the at least one processor implements the real-time bidding interface to send the notifications to the advertisers indicating that the purchased advertisement spot has aired, the notifications formatted to comply with a standard protocol utilized by the advertisers for serving video advertisements over a communications channel.

8. The system of claim 1 wherein the at least one processor implements the real-time bidding interface to send notifications to the advertisers indicating win/loss outcomes for the real-time bids submitted by the advertisers.

9. The system of claim 8 wherein the at least one processor implements the real-time bidding interface to send daily notifications to the advertisers indicating the win/loss outcomes for the real-time bids submitted by the advertisers.

10. The system of claim 1 wherein the at least one processor implements the real-time bidding interface to receive a plurality of bids from the advertiser and receives an advertiser-specified budget which spans the received plurality of bids, each of the plurality of bids specifying a respective bid price and a sum of the bid prices of the plurality of bids exceeds the advertiser-specified budget, the at least one processor prevents acceptance of bids from the advertiser once the advertiser-specified budget for the plurality of bids is exceeded by the acceptance of the mediacast content providers of other bids by the advertiser for the received plurality of bids.

11. The system of claim 10 wherein the received plurality of bids comprises the bids from an advertiser for all advertisement placement opportunities which meet one or more criteria specified by the advertiser.

12. The system of claim 10 wherein the advertiser-specified budget spans at least two media types including television, radio, or digital placement of media.

13. The system of claim 1 wherein the at least one processor implements the real-time bidding interface to receive a plurality of bids from an advertiser and receives an advertiser-specified maximum concentration which spans the received plurality of bids, the at least one processor prevents acceptance of bids from the advertiser once the advertiser-specified maximum concentration for the received plurality of bids is exceeded by acceptance by the mediacast content providers of other bids by the advertiser for the received plurality of bids.

14. The system of claim 13 wherein the advertiser-specified maximum concentration comprises a maximum number of acceptances with respect to at least one of a market, an affiliate, a period of time, a media outlet, a geographical area, or a group of consumers.

15. The system of claim 1 wherein the at least one processor implements the real-time bidding interface to receive the real-time bids for selected canonical inventory units of advertisement placement opportunities from one or more advertisers via the at least one data communication channel within one second of when corresponding requests for bids are sent.

16. The system of claim 1 wherein the at least one processor implements an advertiser-facing interface which receives requests for creative ingestion from one or more advertisers via the at least one communication channel.

17. The system of claim 1 wherein the at least one processor implements an advertiser-facing interface which receives requests for a validity status of a creative from one or more advertisers via the at least one communication channel.

18. The system of claim 1 wherein the at least one processor implements the real-time bidding interface to send requests for the real-time bids for each of the plurality of canonical inventory units of advertisement placement opportunities to the advertisers via at least one data communication channel, each of the requests for real-time bids specifies at least one of: an auction type, a maximum amount of time allowed to submit a bid, channel information, device information, or user information.

19. The system of claim 1 wherein the at least one processor implements the real-time bidding interface to receive the real-time bids for selected canonical inventory units of advertisement placement opportunities from one or more advertisers via the at least one data communication channel, and each real-time bid specifies at least one of: a bid price, an advertising campaign constraint, or an identification of the entity which sent the bid.

20. The system of claim 1 wherein the at least one processor implements the real-time bidding interface to receive a plurality of bids for selected canonical inventory units of advertisement placement opportunities from an advertiser, such bids are targeted based at least in part on at least one of: geographic location, channel, time of day, or viewer demographics.

21. The system of claim 1 wherein for at least one of the advertisement placement opportunities in the inventory of the advertisement placement opportunities, the canonical form specifies the respective period of time of the advertisement placement opportunity by at least two of: i) a start time of the respective advertisement placement opportunity, ii) an end time of the respective advertisement placement opportunity, and iii) a duration of the respective advertisement placement opportunity.

22. The system of claim 1 wherein for at least one of the advertisement placement opportunities in the inventory, the canonical form further specifies a day of the week of the advertising placement opportunity.

23. The system of claim 1 wherein the specified period of time for at least some of the advertisement placement opportunities comprises thirty minutes.

24. A method to automate advertisement placement in linear mediacasts, the method comprising:
   storing, in at least one non-transitory processor-readable storage medium, an inventory of advertisement placement opportunities to place advertisements in at least one of a number of linear mediacasts for each of a plurality of mediacast content providers that transmit the mediacasts to a plurality of media consumers, each of the advertisement placement opportunities represented in a canonical form that specifies at least a respective period of time of the advertisement placement opportunity during a mediacast day of the mediacast content provider, wherein the mediacast day includes a plurality of canonical inventory units that each includes at least two non-sequential time slots for advertisement placement opportunities that share a unique channel, market, and period of time;
   sending, via a real-time bidding interface implemented by at least one processor communicatively coupled to the at least one non-transitory processor-readable storage medium, requests for the real-time bids for each of the plurality of canonical inventory units of the advertisement placement opportunities to the advertisers via at least one data communication channel;

responsive to sending the requests, receiving, by the at least one processor via the real-time bidding interface, the real-time bids for the advertisement placement opportunities associated with the plurality of canonical inventory units from one or more advertisers via the at least one data communication channel, wherein each real-time bid is for a particular canonical inventory unit without selecting a particular time slot from the at least two non-sequential time slots in that particular canonical inventory unit; and responsive to receiving the real-time bids for the advertisement placement opportunities, generating and causing presentation of a color-coded heat map reflecting the real-time bids through at least a variance in at least shades of color that represent at least an uplift amount indicating a price difference between (a) a submitted offer corresponding to at least one of the real-time bids and (b) one or more advertisement spots sold through another sales channel, portioned in accordance with the plurality of canonical inventory units, wherein a darker shade of color corresponds to a higher uplift amount, wherein the submitted offer corresponding to at the least one of the real-time bids has a higher price or equal price to the one or more advertisement spots sold through another sales channel;

wherein, for each of the mediacast content provider, the at least one processor implements the real-time bidding interface to send the requests for the real-time bids for each of the advertisement placement opportunities for periods of time which span an entire mediacast period of time for the mediacast content provider;

wherein the mediacast period of time for the mediacast content provider includes a plurality of consecutive mediacast days beginning on a day which is after the day on which the requests for the real-time bids are sent to the advertisers.

25. The method of claim 24, further comprising: implementing a daily close of all requests for the advertisement placement opportunities pertaining to a given mediacast day.

* * * * *

UNITED STATES PATENT AND TRADEMARK OFFICE
CERTIFICATE OF CORRECTION

PATENT NO. : 11,941,665 B2  
APPLICATION NO. : 15/279073  
DATED : March 26, 2024  
INVENTOR(S) : Tyler Wallace Box et al.

Page 1 of 1

It is certified that error appears in the above-identified patent and that said Letters Patent is hereby corrected as shown below:

In the Claims

<u>Column 36, Claim 17, Line 1:</u>
"requests fora validity" should read: -- requests for a validity --.

Signed and Sealed this
Seventeenth Day of June, 2025

Coke Morgan Stewart
*Acting Director of the United States Patent and Trademark Office*